(12) United States Patent
Nicolis et al.

(10) Patent No.: US 10,319,365 B1
(45) Date of Patent: Jun. 11, 2019

(54) TEXT-TO-SPEECH PROCESSING WITH EMPHASIZED OUTPUT AUDIO

(71) Applicant: Amazon Technologies, Inc., Seattle, WA (US)

(72) Inventors: Marco Nicolis, Gdansk (PL); Adam Franciszek Nadolski, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 15/193,437

(22) Filed: Jun. 27, 2016

(51) Int. Cl.
| | |
|---|---|
| *G10L 15/28* | (2013.01) |
| *G10L 13/10* | (2013.01) |
| *G10L 15/26* | (2006.01) |
| *G10L 13/033* | (2013.01) |
| *G10L 15/18* | (2013.01) |
| *G10L 15/02* | (2006.01) |
| *G10L 15/14* | (2006.01) |

(52) U.S. Cl.
CPC ............ *G10L 13/10* (2013.01); *G10L 13/033* (2013.01); *G10L 15/02* (2013.01); *G10L 15/142* (2013.01); *G10L 15/1807* (2013.01); *G10L 15/26* (2013.01); *G10L 2015/025* (2013.01)

(58) Field of Classification Search
CPC ....... G10L 13/10; G10L 15/142; G10L 15/02; G10L 13/033; G10L 15/26; G10L 15/1807; G10L 2015/025

USPC ......................................................... 704/235
See application file for complete search history.

(56) References Cited

U.S. PATENT DOCUMENTS

| | | | | |
|---|---|---|---|---|
| 9,070,366 | B1* | 6/2015 | Mathias | G06F 17/279 |
| 2005/0071163 | A1* | 3/2005 | Aaron | G10L 13/10 |
| | | | | 704/260 |
| 2007/0100628 | A1* | 5/2007 | Bodin | G10L 13/033 |
| | | | | 704/261 |
| 2009/0076819 | A1* | 3/2009 | Wouters | G10L 13/033 |
| | | | | 704/260 |
| 2012/0303371 | A1* | 11/2012 | Labsky | G10L 13/08 |
| | | | | 704/260 |
| 2015/0302002 | A1* | 10/2015 | Mathias | G06F 17/279 |
| | | | | 704/9 |

* cited by examiner

*Primary Examiner* — Bharatkumar S Shah
(74) *Attorney, Agent, or Firm* — Pierce Atwood LLP

(57) ABSTRACT

Systems and methods for generating output audio with emphasized portions are described. Spoken audio is obtained and undergoes speech processing (e.g., ASR and optionally NLU) to create text. It may be determined that the resulting text includes a portion that should be emphasized (e.g., an interjection) using at least one of knowledge of an application run on a device that captured the spoken audio, prosodic analysis, and/or linguistic analysis. The portion of text to be emphasized may be tagged (e.g., using a Speech Synthesis Markup Language (SSML) tag). TTS processing is then performed on the tagged text to create output audio including an emphasized portion corresponding to the tagged portion of the text.

20 Claims, 16 Drawing Sheets

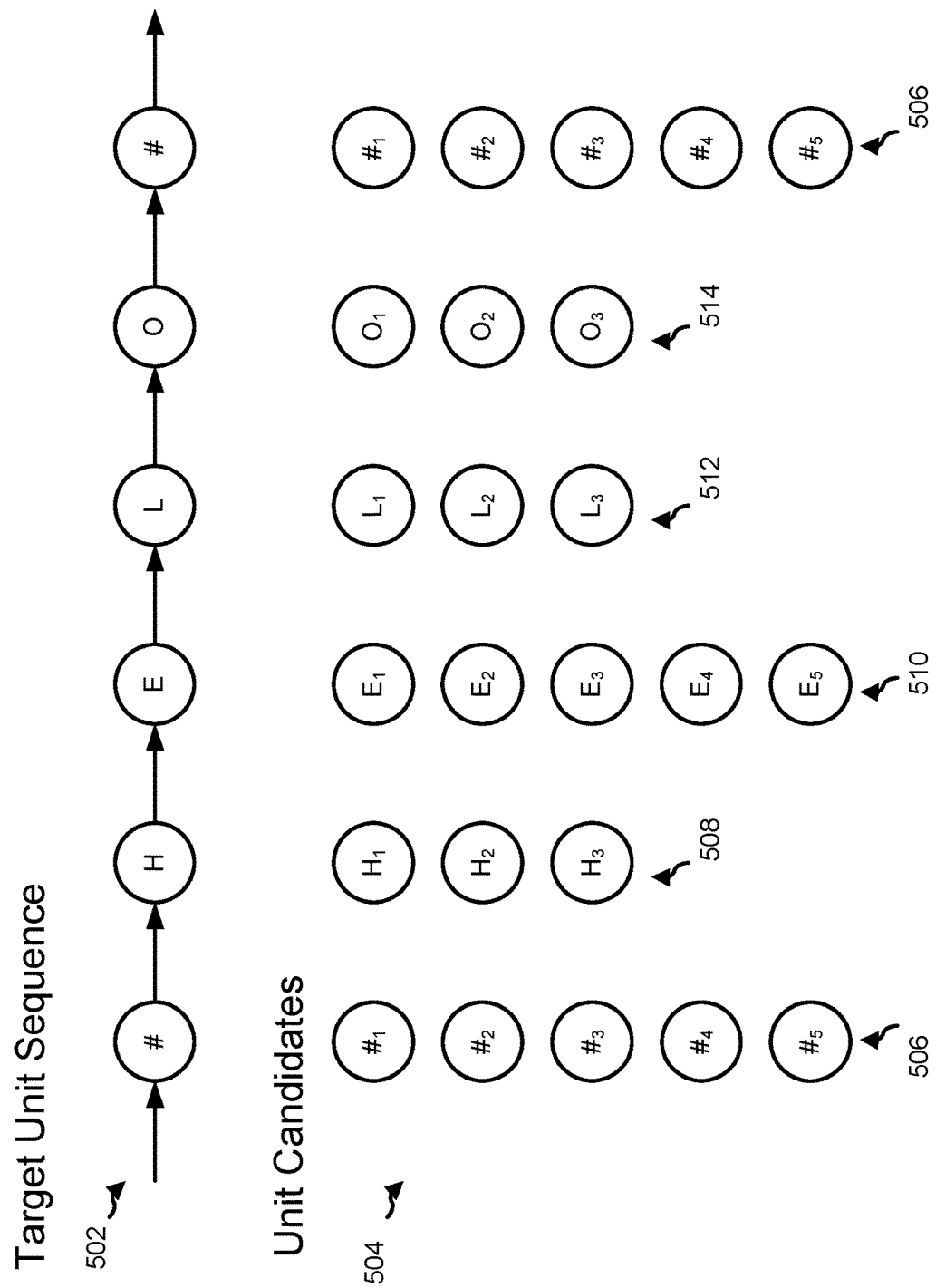

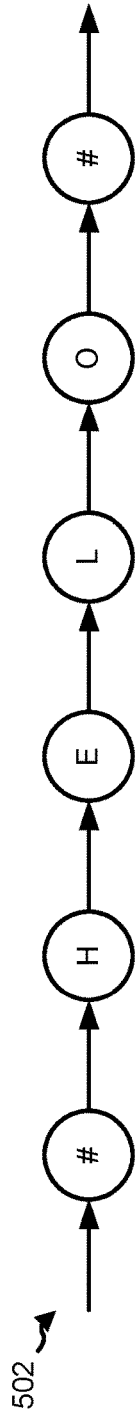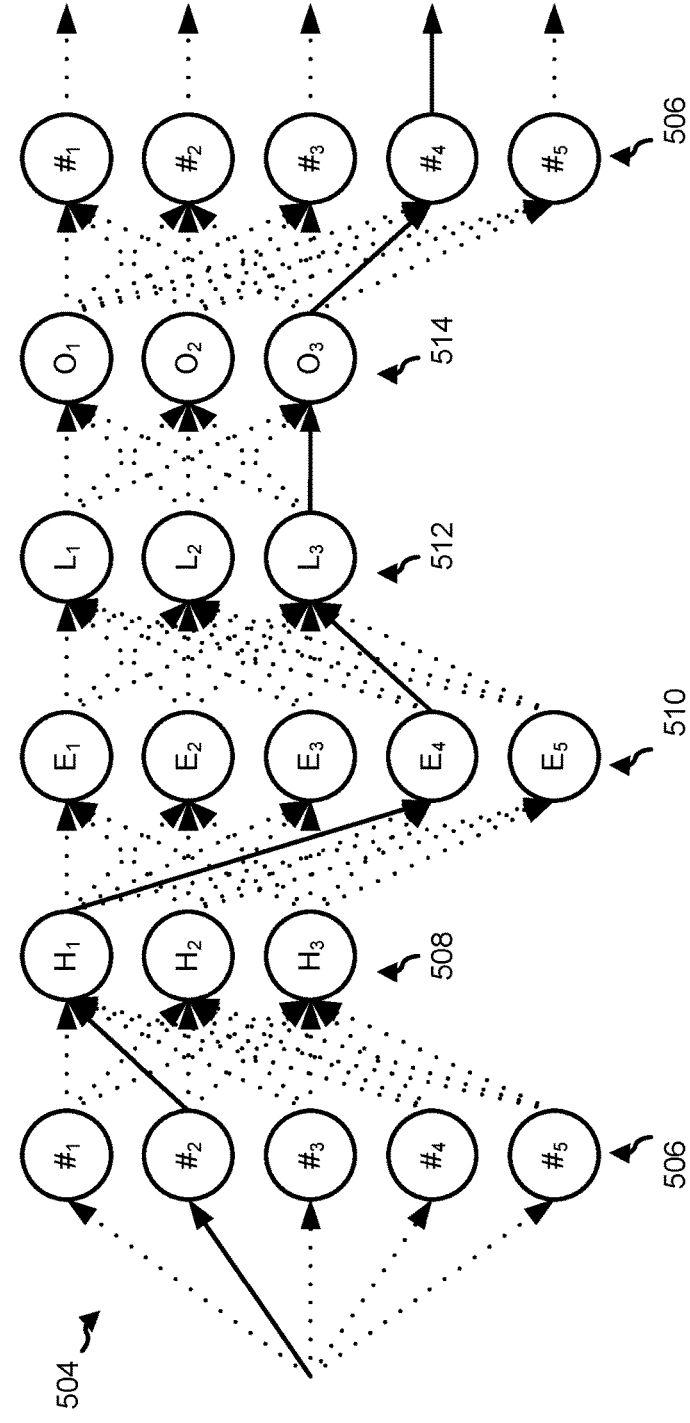
FIG. 5B

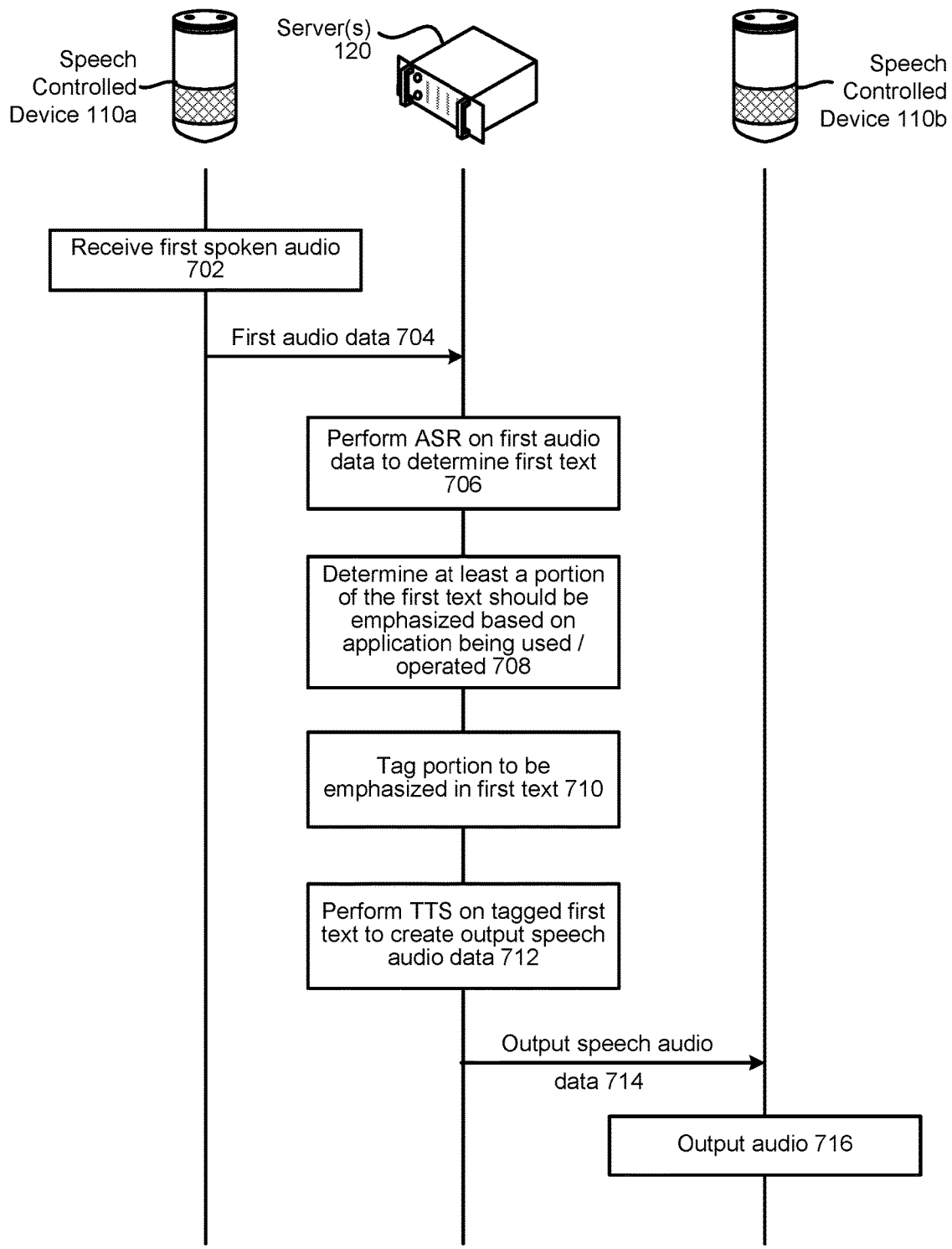

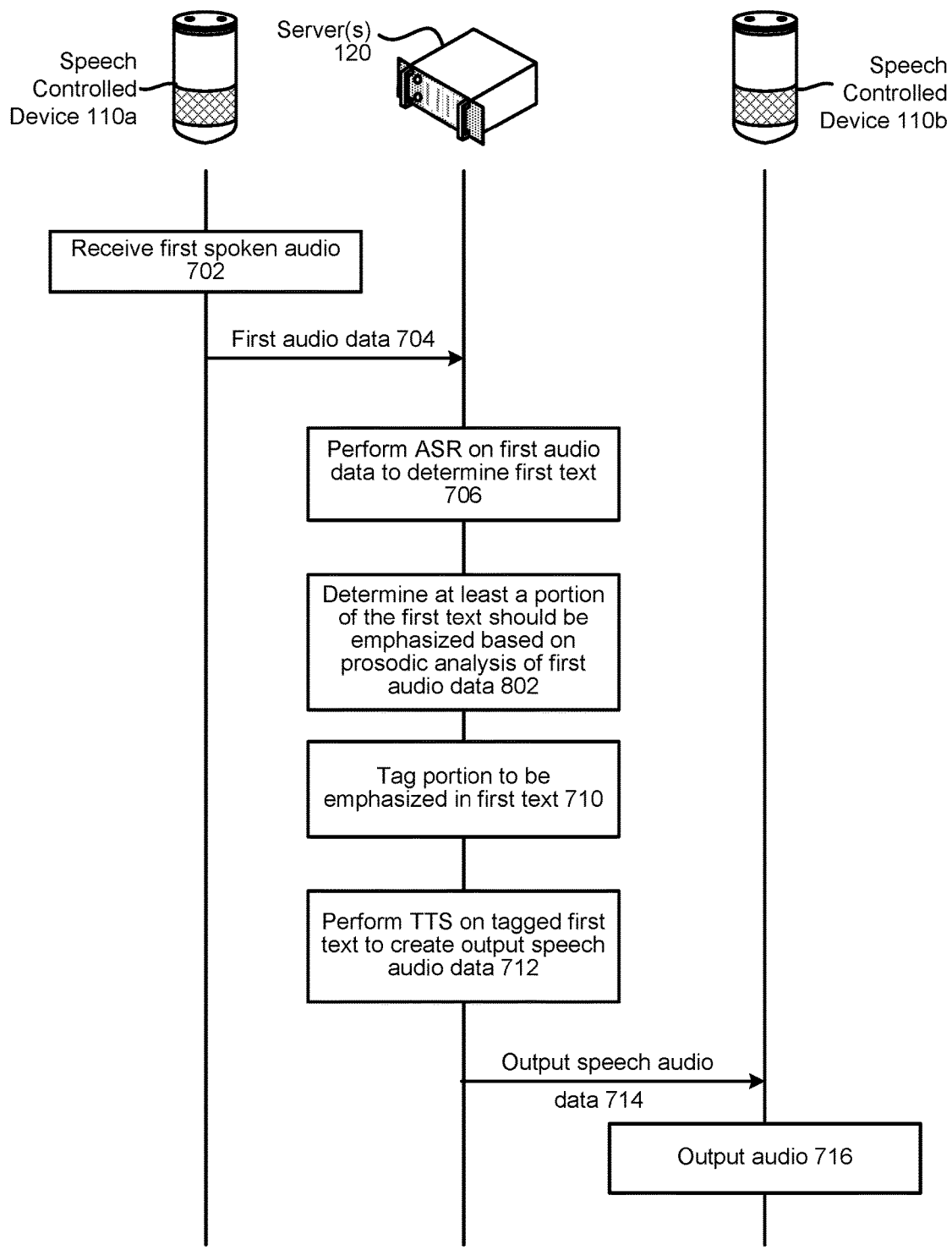

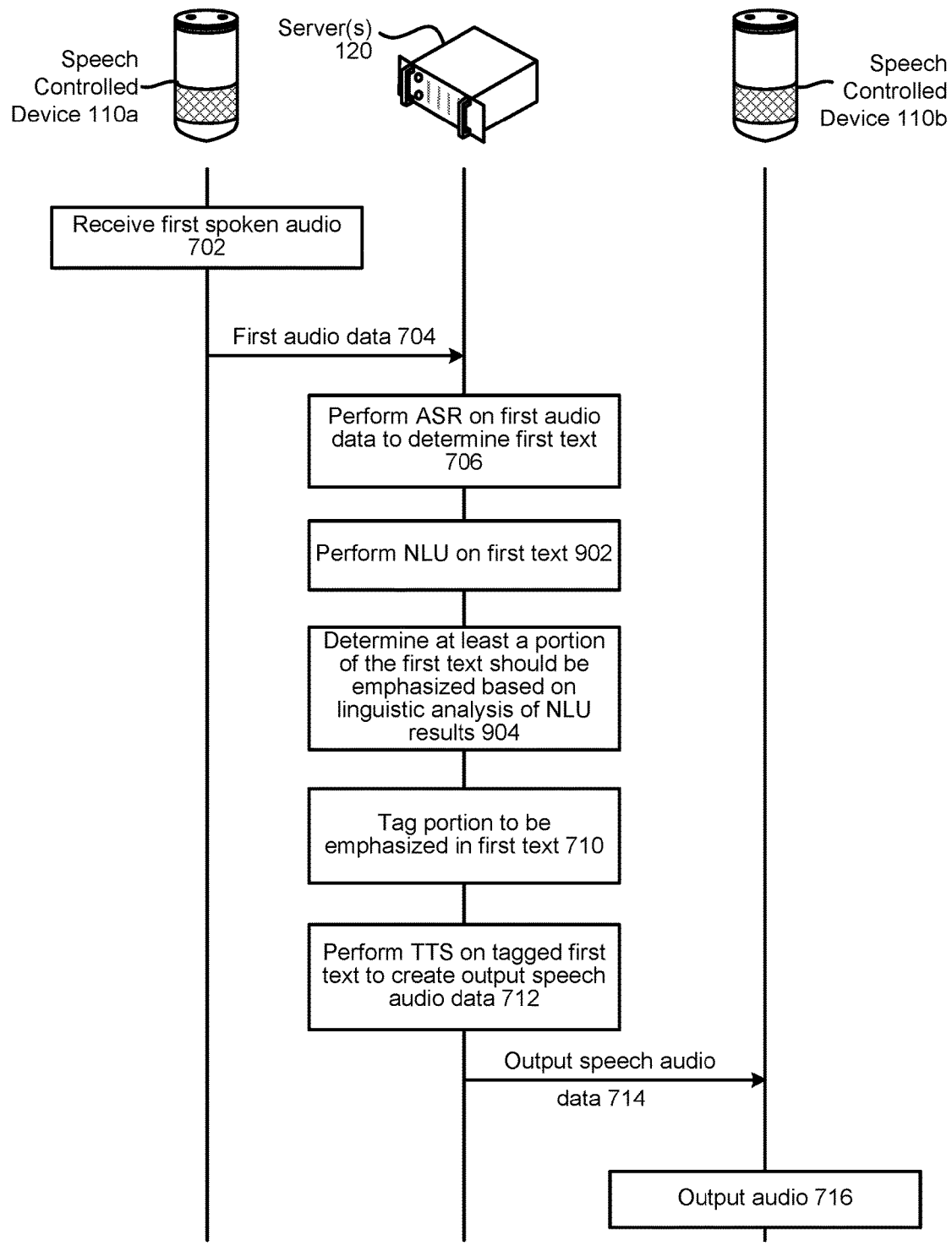

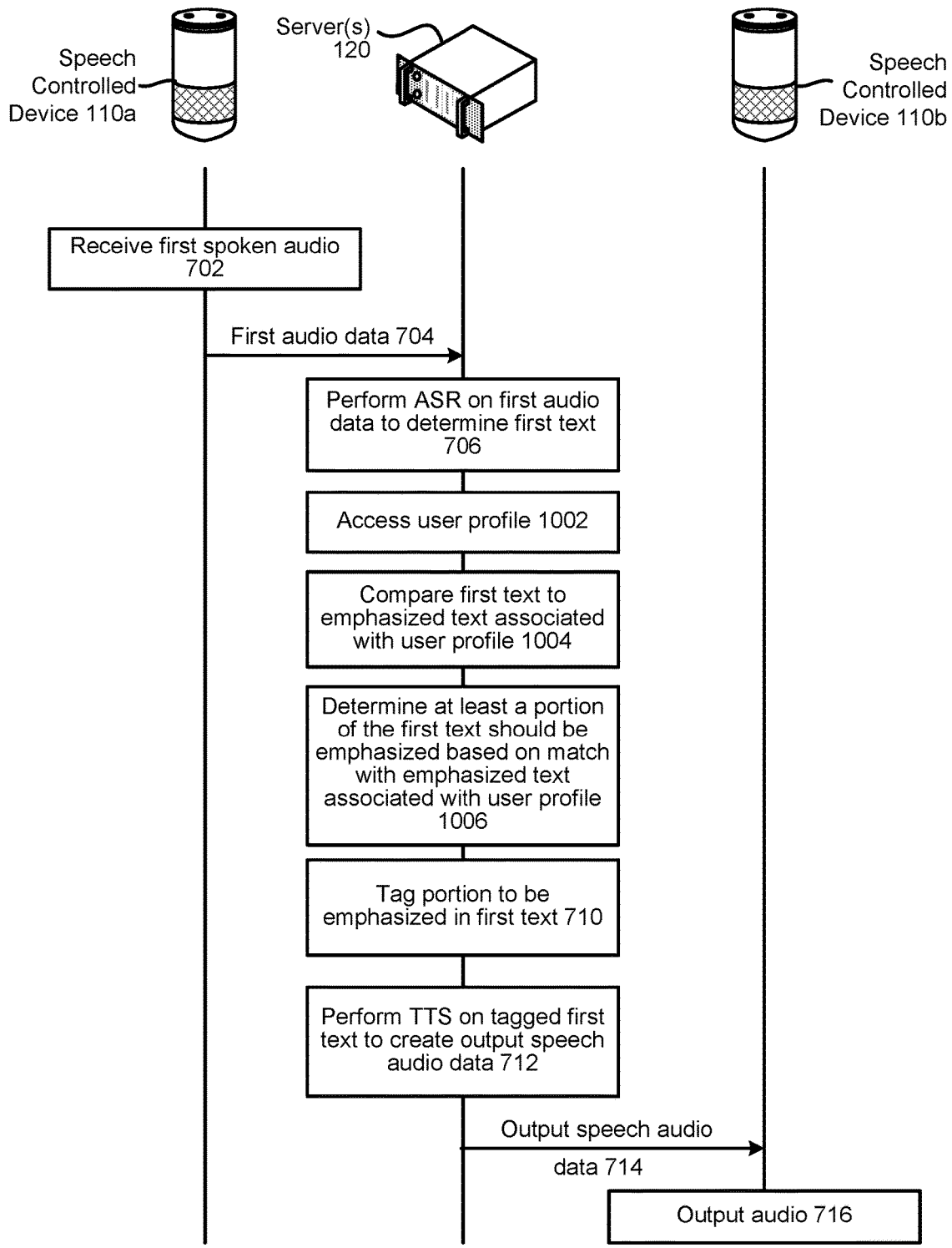

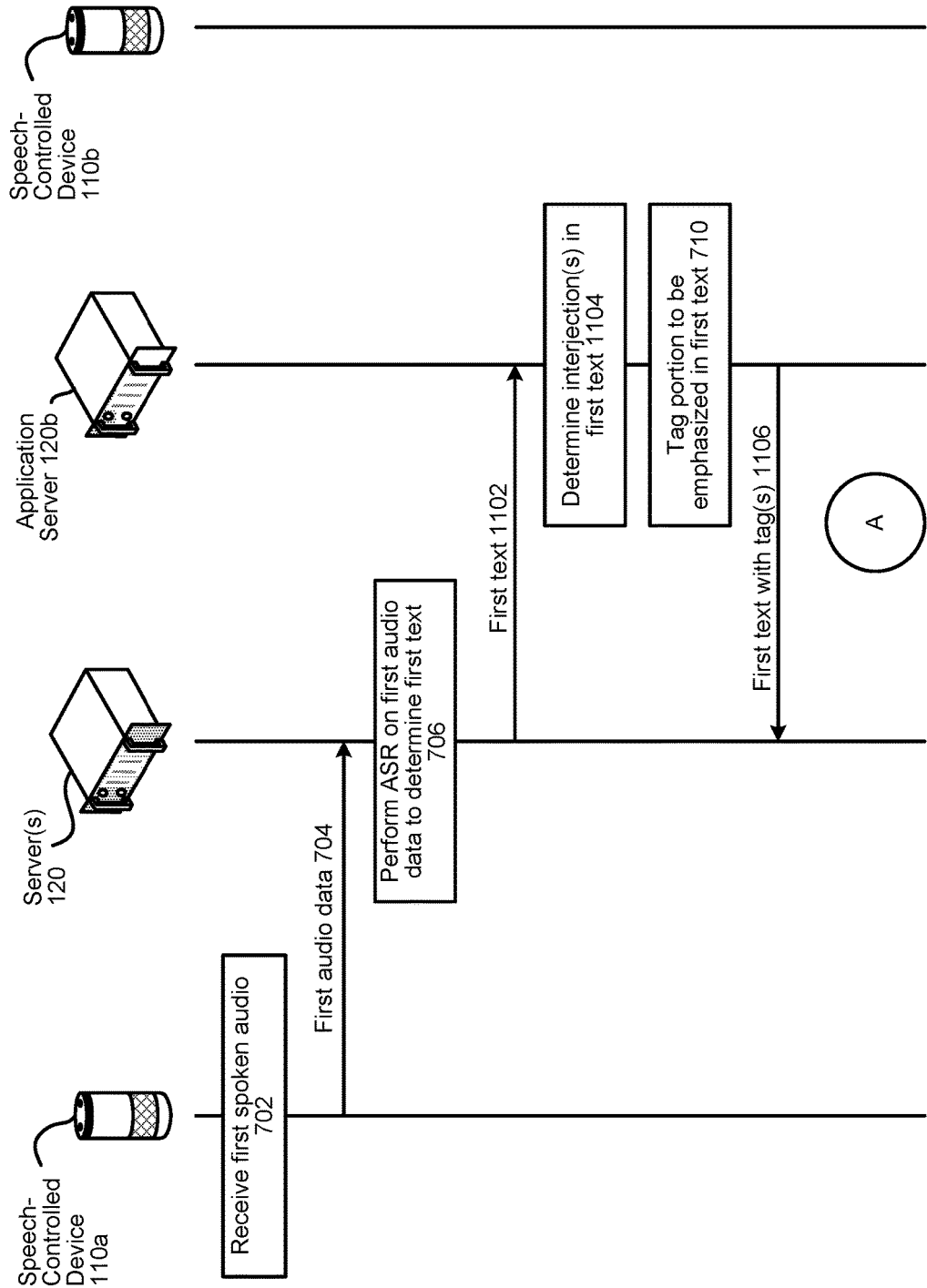

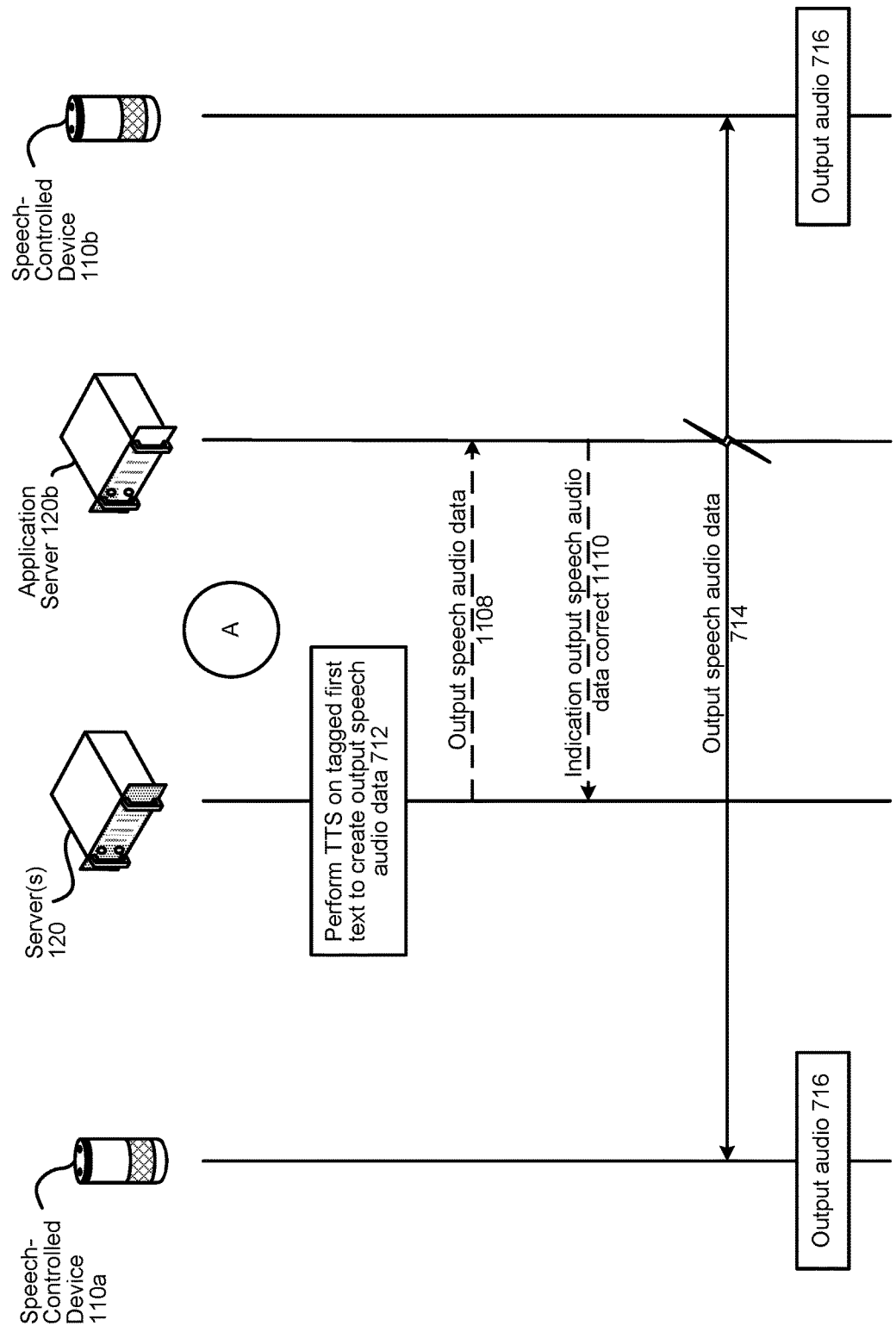

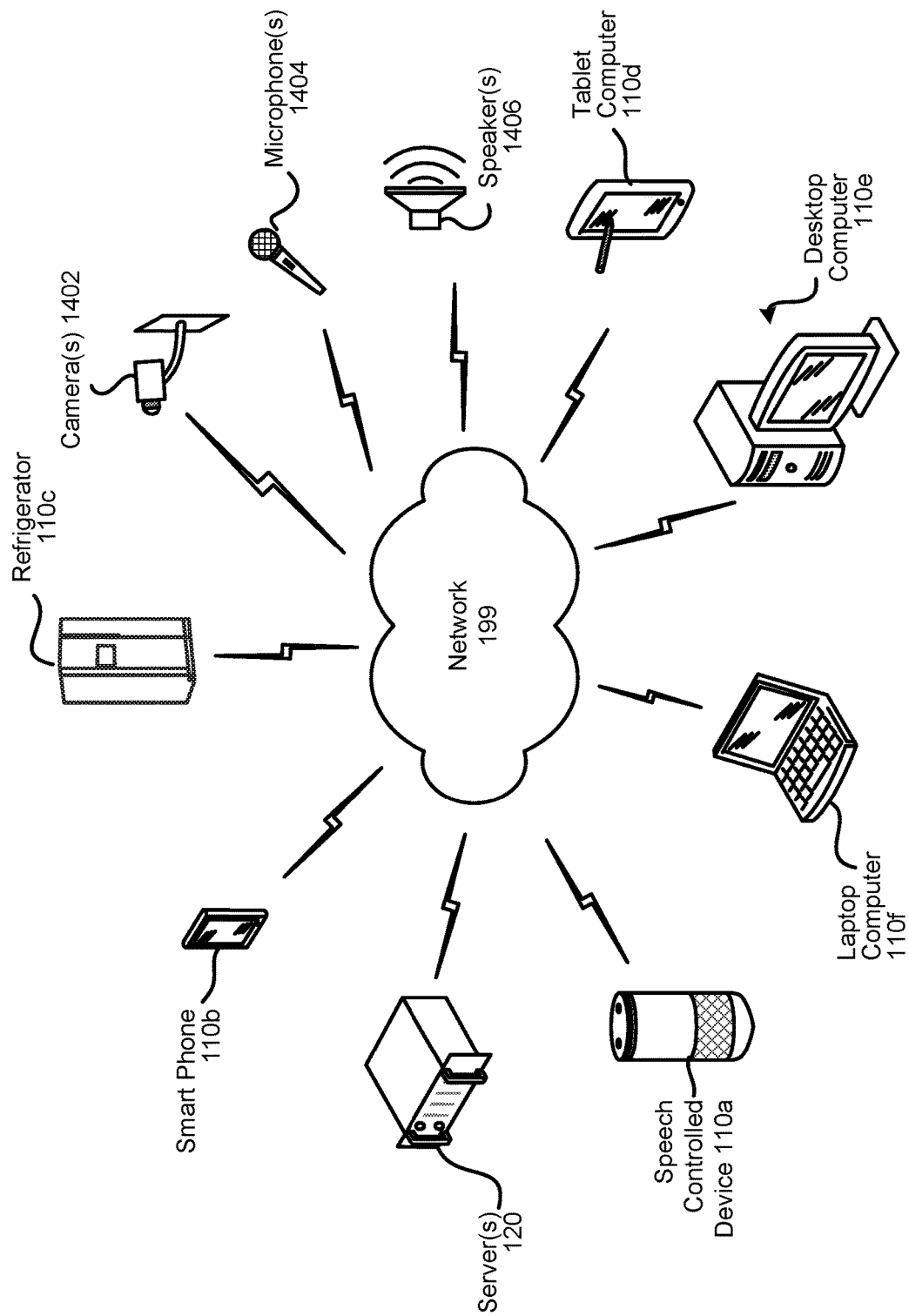

TEXT-TO-SPEECH PROCESSING WITH EMPHASIZED OUTPUT AUDIO

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 5A and 5B illustrate speech synthesis using unit selection according to one aspect of the present disclosure.

FIG. 7 is a signal flow diagram illustrating the generation of output audio with emphasized portions according to embodiments of the present disclosure.

FIG. 8 is a signal flow diagram illustrating the generation of output audio with emphasized portions according to embodiments of the present disclosure.

FIG. 9 is a signal flow diagram illustrating the generation of output audio with emphasized portions according to embodiments of the present disclosure.

FIG. 10 is a signal flow diagram illustrating the generation of output audio with emphasized portions according to embodiments of the present disclosure.

FIGS. 11A and 11B are a signal flow diagram illustrating the generation of output audio with emphasized portions according to embodiments of the present disclosure.

FIG. 14 illustrates an example of a computer network for use with the system.

DETAILED DESCRIPTION

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

The present disclosure provides systems and methods for generating output audio with emphasized portions. Spoken audio is obtained and undergoes speech processing (e.g., ASR and/or NLU) to create text. It may be determined that the resulting text includes a portion that should be emphasized (e.g., an interjection). The determination for emphasis may be made using at least one of knowledge of an application being run by the system, prosodic analysis, and/or linguistic analysis. The portion of text to be emphasized may be tagged (e.g., using a Speech Synthesis Markup Language (SSML) tag). TTS processing is then performed on the tagged text to create output audio including an emphasized portion corresponding to the tagged portion of the text. This results in computer generated output audio having appropriate emphasis/inflection. The emphasis/inflection may match originally spoken audio that initiated a command that results in the TTS output.

Figure 1:
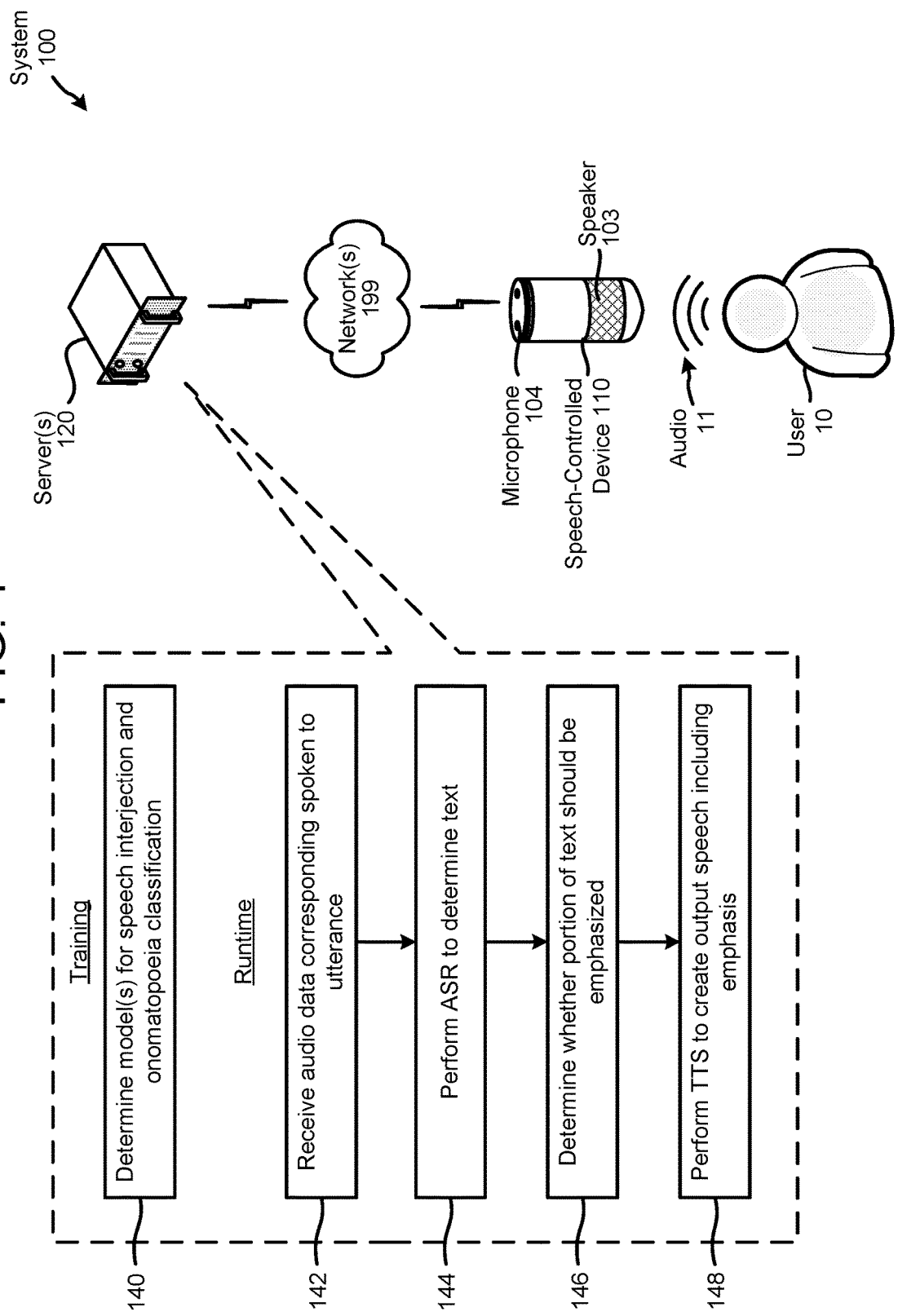
FIG. 1 illustrates a system for generating output audio with emphasized portions according to embodiments of the present disclosure.

FIG. 1 shows a system 100 configured to generate output audio with emphasized portions. Although FIG. 1, and lower figures/discussion, illustrate the operation of the system 100 in a particular order, the steps described may be performed in a different order (as well as certain steps removed or added) without departing from the intent of the disclosure. As shown in FIG. 1, the system 100 may include one or more devices 110 local to a user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server 120 may be capable of performing all speech processing or multiple servers 120 may combine to perform the speech processing. Further, the server(s) 120 may be configured to execute certain commands, such as answering queries spoken by the user 10. In addition, certain speech detection or command execution functions may be performed by the device 110.

As shown in FIG. 1, the system 100 may be configured to respond to an utterance with computer generated audio including at least one emphasized portion. As shown, a speech controlled device 110 equipped with one or more microphones 104 is connected over a network 199 to one or more servers 120. The device 110 is configured to detect audio 11 corresponding to a spoken utterance from a user 10. The device 110 may then send audio data corresponding to the audio 11 to the server 120 for further processing, including analyzing the audio data to classify the utterance and to respond to the utterance, for example by executing a command, determining a synthesized speech output, or the like.

To perform these operations, during a training phase the system 100 may determine one or more models to classify the incoming speech as having one or more qualities, for example, whether the speech includes an interjection(s) or onomatopoeia(s) (illustrated as 140). For example, an interjection may be "HEY," "WOW," "YIKES," etc. For further example, an onomatopoeia may be "zooooooom," "cooooooool," etc. The system 100 may also be trained to determine certain text is associated with certain distinctive sounds or pronunciations. For example, the system 100 may be trained to recognize certain text such as "neat," "wow," "hah," "LOL" or the like as text to be pronounced in an exaggerated or special way, different from other text that may be surrounding that text for ultimate synthesis in text-to-speech processing.

During runtime, the user 10 speaks an utterance (represented by input audio 11) including a query to the speech-controlled device 110. The input audio 11 may be captured by one or more microphones 104 of the device 110 and/or a microphone array (not illustrated) separated from the device 110. The microphone array may be connected to the device 110 such that when the input audio 11 is received by the microphone array, the microphone array sends audio data corresponding to the input audio 11 to the device 110. Alternatively, the microphone array may be connected to a companion application of a mobile computing device (not illustrated), such as a smart phone, tablet, etc. In this example, when the microphone array captures the input audio 11, the microphone array sends audio data corresponding to the input audio 11 to the companion application, which forwards the audio data to the device 110. If the device 110 captures the input audio 11, the device 110 may convert the input audio 11 into audio data and send the audio data to the server(s) 120. Alternatively, if the device 110 receives audio data corresponding to the input audio 11 from the microphone array or companion application, the device 110 may simply forward the received audio data to the server(s) 120.

In any event, the server 120 receives audio data corresponding to a spoken utterance (illustrated as 142). The server 120 performs ASR on the audio data to determine text (illustrated as 144). The server 120 also determines a portion of the text to be communicated to a second user (not illustrated). Using the model(s), the server 120 determines whether the portion of text to be communicated includes one or more words to be emphasized (illustrated as 146). The server 120 may determine whether the text includes one or more interjections or onomatopoeias. For example, a natural language processing (NLP) pipeline may process the text to determine text to be emphasized based on vocalization, etc. In another example, text may be determined to be emphasized if the text contains all capital letters. Moreover, the system may include stored audio files to be activated/used when all capital text is present. For example, if the text includes "HEY," the system may have stored therein an audio file that includes screamed or shouted "HEY." Thus it should be appreciated that the mere appearance of a word with text, as opposed to ASR and NLU results, may cause words to be emphasized.

The portion of text to be emphasized may be tagged (e.g., using an SSML tag) (not illustrated). The portion of text to be communicated (including the tag(s)) is sent to a TTS processing component of the system 100, which creates output audio data including an emphasized portion corresponding to the tagged portion of the text (illustrated as 148). As used herein, emphasis may be referred to as a change in pitch and/or duration as compared to that of surrounding words. Thus determination of the emphasis of a word(s) may determine the pitch of the word(s) and/or how long the word(s) should be pronounced in the output audio data. When performing TTS processing to create audio data including emphasized portions, the system may access two separate databases. One database may include speech units for non-emphasized speech while another database may include speech units specific to emphasized speech. When performing TTS, a TTS component of the system may be configured to only access the database of emphasized speech units when the TTS component identifies text tagged to be emphasized. This allows for conjunction units (i.e., specialized audio units that create fluid transitions between emphasized and non-emphasized audio) to be easily implemented within the system of the present disclosure. A conjunction unit may be used between two speech units (such as diphones) as described herein below. A conjunction unit may be used in the middle of a single word to join an emphasized portion of speech with a portion of speech that sounds normal. For example, if a user says "greeeeeeeeat," speech units for the non-emphasized portions "gr" and "at" may be obtained from the non-emphasized speech unit database and a conjunction speech unit for the emphasized portion "eeeeeeee" may be obtained from the emphasized speech unit database. A conjunction unit may also be used to transition between words. For example, if a user says "that's COOL Fred," speech units for the non-emphasized portions "that's" and "Fred" may be obtained from the non-emphasized speech unit database and a conjunction unit(s) for "COOL" may be obtained from the emphasized speech unit database. It should also be appreciated that a single database including both non-emphasized and emphasized (e.g., conjunction) speech units may be used.

According to the present disclosure, a word may be determined to be emphasized based on punctuation surrounding the word. For example, if the user says "Wow! That is great," it may be determined that "wow" should be emphasized based on the presence of the exclamation mark.

Moreover, a word may be determined to be emphasized based on the user pronouncing single letters. For example, if the user states "L.O.L.", it may be determined that "L.O.L" should be emphasized.

In an example, the system 100 may be implemented with two speech-controlled devices 110 and 110*b* (not illustrated in FIG. 1). Users may be able to send messages between the devices 110 and 110*b*. For example, the audio 11 may include "Hey! Are you going to the game tonight?" The server 120 may determine "hey" is an interjection, and tag "hey" within ASR text results. TTS processing may then be performed on the tagged text to create computer generated audio data wherein "hey" is emphasized. This audio data may be sent to and output by a second speech-controlled device 110*b*. As such, the audio output by the device 110*b* includes inflections and emphasis similar to those within the spoken audio 11. This results in a more rich and conversation-like experience as compared to traditional computer generating speech systems, which are typically substantially monochromatic.

In another example, the system may be implemented to perform TTS output where the character of the TTS output is not necessarily linked to a spoken input. For example, the speech-controlled device 110 of the system 100 may be used to audibly read a book (e.g., an e-book) to the user 10. In this example, the server 120 may receive book text from a content source. The book text may be pre-tagged by the content source to indicate the presence of interjections, onomatopoeias, or other emphasized words within the book text. Alternatively, the book text may be received by the server 120 without tagging. In this instance, the server 120 may process the book text to tag any interjections, onomatopoeias, etc. within the book text. Whether the book text is tagged by the content source or the server 120, the tagged book text is processed to produce book audio data, which is output via a speaker 103 of the device 110, or a speaker separated from but in communication with the device 110. By performing TTS processing on the tagged book text, the book audio output to the user 10 may be more exciting to the user 10 and more similar to how an individual would read the book. This results in a better user experience.

In yet a further example, the text output by ASR processing may include particular text, such as an interjection, that may be pronounced in a number of different ways. For example, the text may include the word "boom." The system 100 may flag "boom" as a word that has interjection alternatives, and may then determine due to acoustic characteristics of the input audio data corresponding to an input utterance (e.g., relative volume compared to other words received by the device 110, relative time for a baseline associated with how long people usually take to say "boom," etc.) that "boom" was said with emphasis. The system 100 may then perform TTS on the tagged "boom" text to configure output audio corresponding to a particular emphasized pronunciation of the text, for example pronouncing the word as "BOOM!" instead of "boom." Or the system may determine that a different pronunciation is appropriate. As another example, if the user says "boom" but holds the "o" sound longer than average, the TTS generated audio output may correspond to "boooooooooooooooooom!" The system 100 may know the text can be pronounced different ways (e.g., boom, BOOM, boooooooooom) and may select a TTS pronunciation based on user preferences, the input speech command, application settings, and/or other factors.

Alternatively, the server 120 may receive book audio data from the content source. The book audio data may be pre-tagged by the content source to indicate the presence of interjections, onomatopoeias, or other emphasized words within the book audio data. Alternatively, the book audio data may be received by the server 120 without tagging. In this instance, the server 120 may perform ASR on the book audio data to create book text, and process the book text to tag any interjections, onomatopoeias, etc. within the book text.

In yet another example, an application, run on either the server 120, an application server, or a smart device (e.g., a phone, tablet, etc.) in communication with the device 110, may, as part of its operation, output audio to the user 10 via the device 110. Such an application may be a gaming application or the like. In this example, the server 120 may receive text from an application server. The text may be pre-tagged by the application server to indicate the presence of interjections, onomatopoeias, or other emphasized words within the book text. Alternatively, the text may be received by the server 120 without tagging. In this instance, the server 120 may process the text to tag any interjections, onomatopoeias, etc. within the text. Whether the text is tagged by the application server or the server 120, the tagged text is processed to produce audio data, which is output via a speaker 103 of the device 110, or a speaker separated from but in communication with the device 110. By performing TTS processing on the tagged text, the audio output to the user 10 may be more exciting and realistic to the user 10, thereby resulting in a better user experience.

Alternatively, the server 120 may receive audio data from the application server. The audio data may be pre-tagged by the application server to indicate the presence of interjections, onomatopoeias, or other emphasized words within the audio data. Alternatively, the audio data may be received by the server 120 without tagging. In this instance, the server 120 may perform ASR on the audio data to create text, and process the text to tag any interjections, onomatopoeias, etc. within the book text.

The above determinations of speech quality, such as for an interjection, by the server 120 may be performed by a speech quality module 220, described below.

Figure 2:
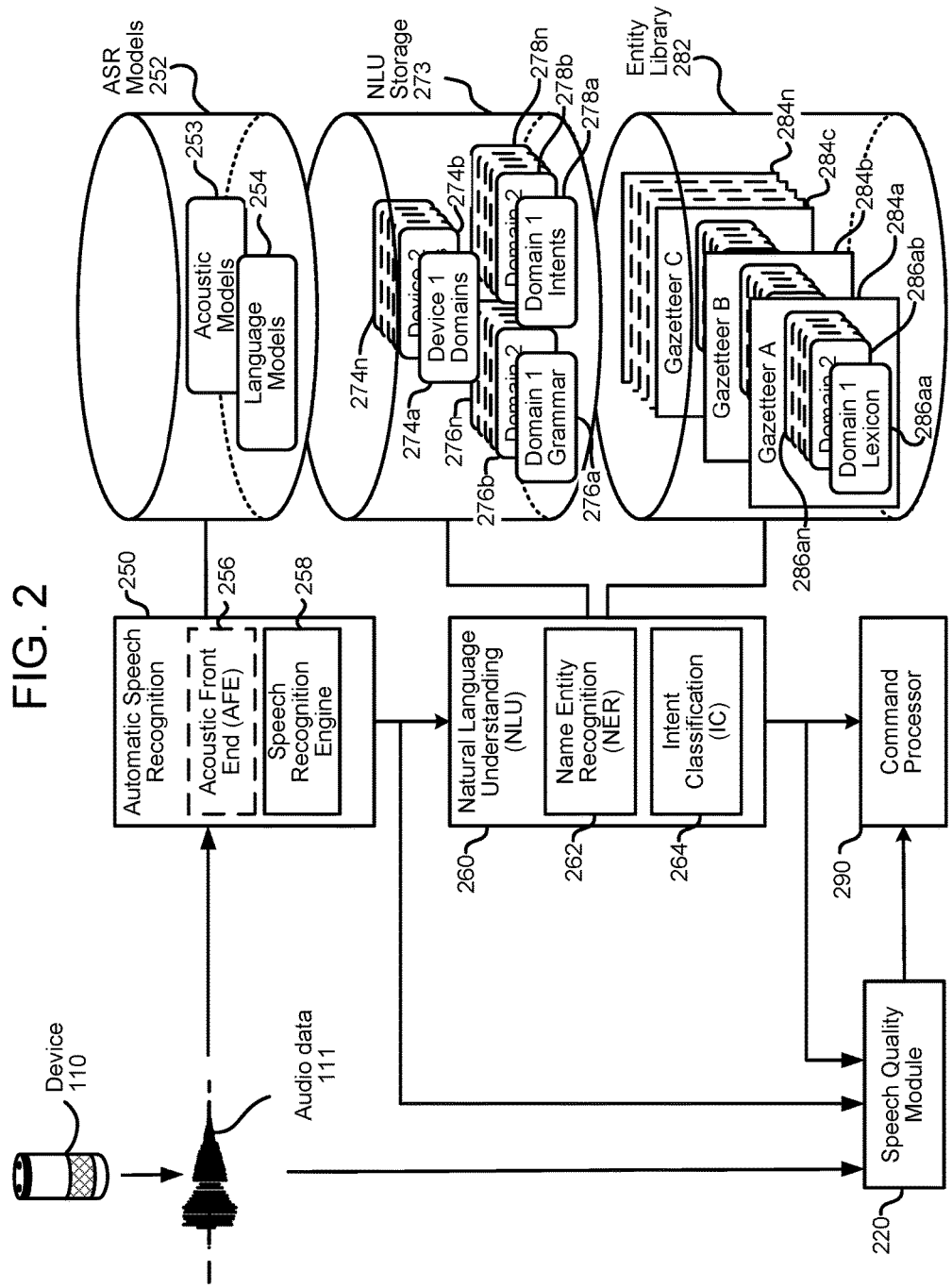
FIG. 2 is a conceptual diagram of how a spoken utterance may be processed according to embodiments of the present disclosure.

Further details of generating output audio with emphasized portions are explained below, following a discussion of the overall speech processing system of FIG. 2. The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as a microphone 104 of device 110, captures audio 11 corresponding to a spoken utterance. The device sends audio data 111 corresponding to the utterance, to an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

An ASR process 250 converts the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data from the microphone into data for processing by the speech recognition engine 158. The speech recognition engine 258 compares the speech recognition data with acoustic models 253, language models 254, and other data models and information for recognizing the speech conveyed in the audio data. The AFE 256 may reduce noise in the audio data and divide the digitized audio data into frames representing time intervals for which the AFE 256 determines a number of values, called features, representing the qualities of the audio data, along with a set of those values, called a feature vector or audio feature vector, representing the features/qualities of the audio data within the frame. Many different features may be determined, as known in the art, and each feature represents some quality of the audio that may be useful for ASR processing. A number of approaches may be used by the AFE 256 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing 260 may include a named entity recognition (NER) module 252, intent classification (IC) module 264, NLU storage 273 and a and knowledge base (not shown). The knowledge base is a database or other information storage that may include information about entities that may be used in resolving user queries. The NLU process may also utilize gazetteer information (284a-284n) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as processed from ASR 250 based on the utterance 11) and attempts to make a semantic interpretation of the text. That is, the NLU process 260 determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process 260 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the NLU's storage 273). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 262 may also use contextual operational rules to fill slots. For example, if a user had previously requested to pause a particular song and thereafter requested that the voice-controlled device "please un-pause my music," the NER module 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search query (for example, requesting the return of search results), the destination command processor 290 may include a search engine processor, such as one located on a search server, configured to execute a search command and determine search results, which may include output text to be processed by a TTS engine and output from a device as synthesized speech.

Typically, an ASR system may be capable of performing speech recognition on speech of various qualities, without specific regard to those certain qualities. For example, an ASR system may be capable of converting an utterance to text regardless of whether that utterance is whispered, spoken in an excited voice, spoken in a sad voice, whined, shouted, etc. In fact, traditional ASR systems do not care about such voice qualities. Instead, traditional ASR systems only care about recognizing the words in the speech, not any paralinguistic qualities.

The present system may be configured to detect speech quality/qualities and determine a label/tag corresponding to the detected qualities that may be applied to an utterance in the speech and used for later processing. The speech quality may be based on paralinguistic metrics that describe some quality/feature other than the specific words spoken. Paralinguistic features may include acoustic features such as speech tone/pitch, rate of change of pitch (first derivative of pitch), speed, prosody/intonation, resonance, energy/volume, hesitation, phrasing, nasality, breath, whether the speech includes a cough, sneeze, laugh or other non-speech articulation (which are commonly ignored by ASR systems), detected background audio/noises, distance between the user and a device, etc.

Current ASR systems may be configured to detect some such paralinguistic features, however current systems are not configured to analyze those features to put a descriptive label on the speech (such as whisper, etc.) in order to pass that label/tag as an input to downstream processing, such as coordinating the voicing of the input utterance with the voicing of TTS output or execution of a command included in the utterance. The present system includes a speech quality module 220, as shown in FIG. 2. The speech quality module 220 may process the audio data 111 to determine if the incoming audio data includes certain characteristics that apply to incoming speech (e.g., shouted, loud, soft, etc.). The speech quality module 220 may process paralinguistic feature data to classify one or more qualities of incoming speech and then alter downstream/output operation in response to the one or more qualities. The speech quality module 220 may also process text that is determined from the input audio data (for example using the output of ASR component 250 and/or output of NLU component 260) to determine, based on the text, if certain words of the text correspond to interjections or other specific sounds for purposes of TTS processing.

The speech quality module 220 may implement a single model that outputs a label, or may implement a plurality of models, each configured to determine, based on feature values input to the model, whether the speech corresponds to a particular quality. For example one model may be configured to determine whether input speech was whispered, another model may be configured to determine whether input speech was shouted/emphasized, etc. Or, as noted, a single model may be configured to determine multiple labels that may apply to input speech (whisper, whine, shout, etc.) based on that speech's qualities. The speech quality module 220 may operate within an ASR sub-system, or as a separate component as part of system 100.

The system may also consider non-audio data and non-audio features when determining a quality of the speech. For example, if a camera detects the speaker, the system may analyze the video data (for example, the video data may be input to the speech quality module 220) to determine some quality of the speaker (agitated, subdued, angry, etc.) that the speech quality module 220 may consider. Other non-audio data may also be input to the speech quality module 220. For example, time/date data, location data (for example GPS location or relative indoor room location), ambient light data from a light sensor, the identity of other nearby individuals to the speaker, proximity of the user to a device (for example, if a user is leaning in close to a device to speak an utterance, or if a user is far away from the device), etc. The speech quality module 220 may also consider text data, such as that output by the ASR module 250 and/or NLU module 260, and may consider certain words in the text data as corresponding to certain types of speech, such as interjections, exclamations, etc., even if the audio data 111 does not necessarily indicate that such words were spoken differently from the remainder of the input utterance. For example, an input utterance may include the speech "we zoomed down the highway" where the words are all said in a similar tone of voice. The speech quality module 220 may not determine from the input audio data 111 any difference between speech of the utterance, but using the text of the utterance as determined by the ASR module 250 and/or NLU module 260 the speech quality module 220 may identify "zoomed" as text normally associated with a potential exclamation or interjection and thus may tag that word as potentially having a distinctive spoken quality.

The types of acoustic and non-audio data considered by the speech quality module 220 depends on the types of such data available to the system 100 when processing an utterance. The model(s) available to the speech quality module 220 may be trained on the various data types available to the speech quality module 220. For example a first model may be trained to detect that input speech is whispered whereas a second model may be trained to determine that ambient light data from a light sensor is below a certain threshold. The output from the second model (or more simply, an output from a component such as the light sensor) may indicate to the first model that the atmosphere is dark, which may be used in increase a confidence of the first model that the input speech was whispered. Other such non-audio data may be used to inform a model trained to determine a quality of input speech based on how the non-audio data impacts the classification of the input speech quality.

Various machine learning techniques may be used to train and/or operate the machine learning models that may be used by the speech quality module 220. In machine learning techniques, an adaptive system is "trained" by repeatedly providing it examples of data and how the data should be processed using an adaptive model until it can consistently identify how a new example of the data should be processed, even if the new example is different from the examples included in the training set from which it learned. Getting an adaptive model to consistently identify a pattern is in part dependent upon providing the system with training data that represents the desired decision features in such a way that patterns emerge. Being provided data with consistent patterns and recognizing such patterns when presented with new and different data is within the capacity of today's systems, and is in fact used by a wide variety of computer systems ranging from handheld personal consumer electronics to complex massively parallel supercomputers. Such efforts fall into the discipline often referred to as "machine learning," which is a sub-discipline of artificial intelligence (also known as machine intelligence).

For example, as above, an adaptive system may be trained using example audio data segments and different values for the various paralinguistic data features available to the system. Different models may be trained to recognize different speech qualities or a single model may be trained to identify applicable speech qualities associated with a particular utterance. For example, a single model may be trained to analyze both audio and non-audio data to determine a speech quality. Alternatively, certain model(s) may be trained to analyze audio data and a separate model(s) may be trained to analyze non-audio data.

Example machine learning techniques include, for example neural networks, inference engines, trained classifiers, etc. Examples of trained classifiers include support vector machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers (either binary or multiple category classifiers) may issue a "score" indicating which category the data most closely matches. The score may provide an indicator of how closely the data matches the category. For example, in the present application, a support vector machine (SVM) may be trained/configured to process audio data, for example audio feature vectors, to determine if speech associated with the audio feature vectors was shouted/emphasized.

Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used to train the models used in the first stage and second stage.

For example, a model, such as an SVM classifier, may be trained to recognize when an input speech utterance is shouted/emphasized using many different training utterances, each labeled either "shouted/emphasized" or "not shouted/emphasized." Each training utterance may also be associated with various feature data corresponding to the respective utterance, where the feature data indicates values for the acoustic and/or non-audio paralinguistic features that may be used to determine if a future utterance was shouted/emphasized. The model may be constructed based on the training utterances and then disseminated to individual devices 110 or to server(s) 120. A speech quality module 220 may then use the model(s) to make decisions at runtime as to whether the utterance was shouted/emphasized. An indicator of the emphasis (e.g., that the speech is an interjection) may then be output from the speech quality module 220 to downstream components such as a command processor 290, TTS module 314, etc. The system may then tailor its operations and/or output based on the fact that the utterance was, or was not, shouted/emphasized. Examples of different models used by the speech quality module 220 to determine the one or more qualities are shown in FIG. 3 as models 353.

Similar training/operation may take place for different speech qualities (excitement, boredom, etc.) where different models are used or a single model is used.

Figure 3:
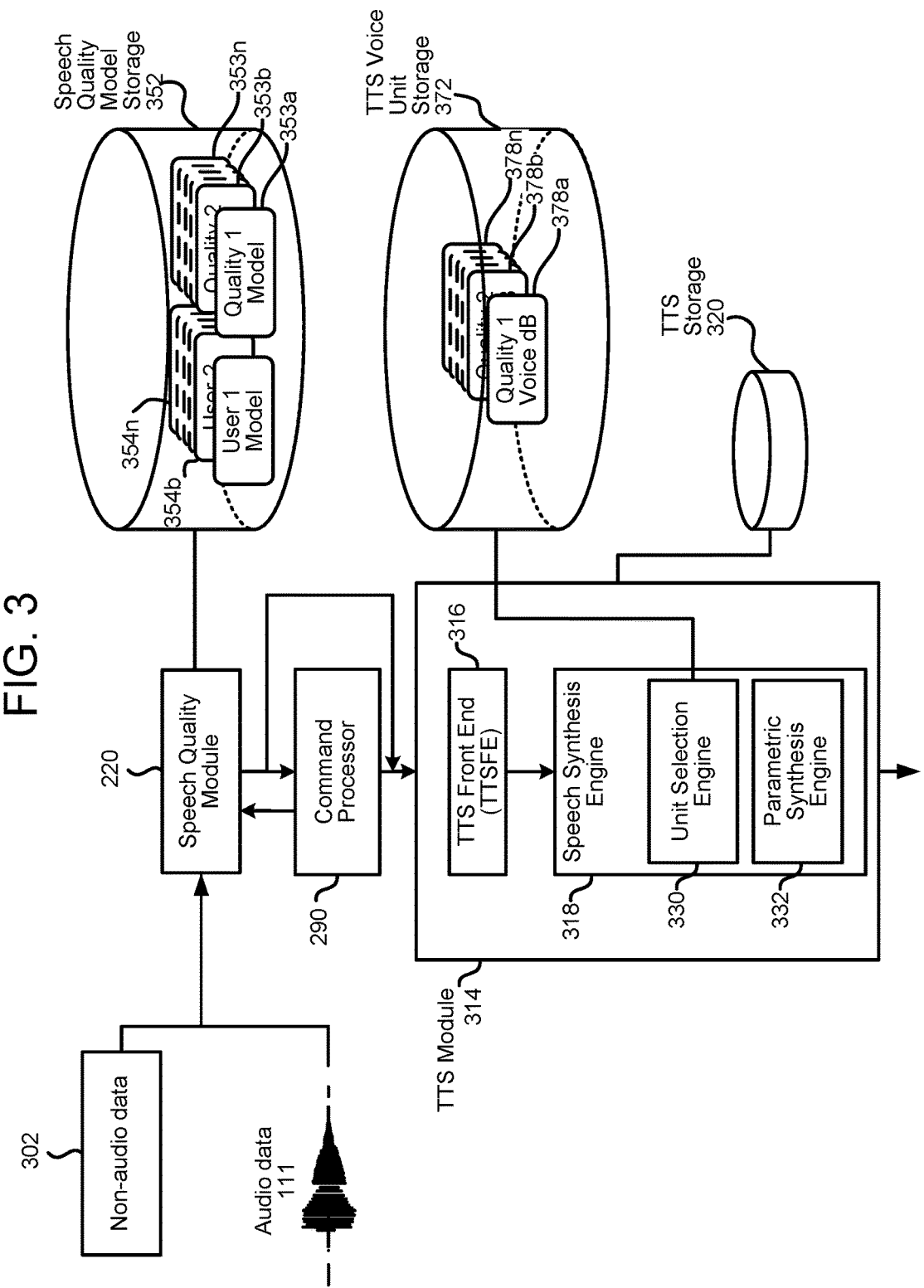
FIG. 3 is a conceptual diagram of how speech quality may be determined and used to determine a command output or text-to-speech output of a system according to embodiments of the present disclosure.

As shown in FIG. 3, the system may also employ customized models 354 that are customized for particular users. Each user may have multiple such models. The user models 354 may be used by the speech quality module 220 to select a speech quality in a manner more customized for a specific user. For example, the system may track a user's utterances to determine how they normally speak, or how they speak under certain conditions, and use that information to train user-specific models 354. Thus the system may determine the speech quality using some representation of a reference of how a user speaks. The user models 354 may incorporate both audio and non-audio data, which may incorporate not only how a user speaks, but how a user speaks under particular circumstances (i.e., with many individuals present, at different locations, under different lighting conditions, etc.) The user models 354 may also take into account eventual commands and/or speech output by the system so that the system may determine how user commands are processed under certain conditions. Each user model 354 may be associated with a user ID, which may be linked to a user profile containing various other information about a particular user. Such profile information may also be used to train the user model 354.

The speech quality module 220 may use the models 353, 354 to process audio data 111 and/or non-audio data 302 to determine one or more speech qualities to associate with an input spoken utterance. Certain words may be emphasized by a user based on non-audio data. For example, a user may emphasize different words based on the time of day. In another example, words may be emphasized based on what application is operating on the device. In a further example, words may be emphasized based on the device is being operated by the user (e.g., a tablet, a speech-controlled device, etc.). The speech quality module 220 may then create an indicator for the determined speech quality/ies. The indicator may then be sent to a downstream command processor 290 so that a command/query may be processed using the indicator and based on the speech quality/ies. The command processor 290 receives the indicator, as well as text and possible other semantic notation related to the utterance, as discussed above in reference to FIG. 2. The command processor 290 may be a component capable of acting on the utterance. Examples of such components include a query processor/search engine, music player, video player, calendaring application, email/messaging application, user interaction controller, personal assistant program, etc. As can be appreciated, many types of command processors 290 are envisioned. The command processor 290 may customize its output based on the speech quality.

For example, if the command processor 290 is a music player, and the utterance included a request to play music, only did not specify a particular music title, the command processor 290 may use the indicator of speech quality to select a music title. Specifically, if a user shouts, in an excited manner, "PLAY SOME MUSIC!!" the speech quality module 220 may send an indicator to the command processor that the speech had a quality of excitement and the NLU module 260 may send the command processor 290 text and semantic indicators that the utterance included a request to play music. The command processor 290 may then select a music title to play based on the quality of excitement and may thus select a rock song or similar up-tempo song from a user's catalog. In another example, if a user whispers "play some music," the speech quality module 220 may send an indicator to the command processor that the speech was whispered and the NLU module 260 may send the command processor 290 text and semantic indicators that the utterance included a request to play music. The command processor 290 may then select a music title to play based on the quality of being whispered and may thus select a mellow or calm song from a user's catalog. Similar selections of actions by different command processors 290 outside the domain of music are also envisioned. As another example, volume of output may be decreased as a result of whispered input speech, or volume increased as a result of excited speech, or the like. As another example, volume of output may be increased if a user is determined to be a long distance away from a device, thus ensuring that the output is loud enough for the user to hear at the user's distance.

A TTS component of the system may be configured to synthesize speech based on a speech quality associated with text to be output by the TTS component. A TTS module 314 may receive an indicator of speech quality and may configure an output speech quality (if output speech is called for) to correspond to (or even match or approximate) the indicated speech quality. The indication of speech quality may be based on input speech (represented by input audio data 111). For example, if a user shouts at least a portion of an utterance including a query to a device 110, the device may send the audio to a server 120. The server may process the audio with a speech quality module 220 to determine the utterance was at least partially shouted and to send an indicator that the speech was at least partially shouted to the TTS module 314. The server (or another server) may perform ASR and NLU processing to identify text. The text may be sent to the TTS module 314 so the TTS module 314 may synthesize speech corresponding to the text including at least a portion of which is shouted/emphasized. Speech may be synthesized by the TTS module as described below.

In another example, the indication of speech quality set to the TTS module 314 may be the result of some command executed by the command processor 290. For example, as part of operating a particular application (such as a video game application, messaging application, or the like), the system may execute a command by the command processor 290. As part of executing that command, the system may determine some text that is to be converted into speech and eventually output by a user device. The system may take the text output by the command processor 290 and send the text to the speech quality module 220 (for example, as shown in FIG. 3). The speech quality module 220 may then determine that a word in the text output by the command processor 290 is an interjection, and may thus create a tag or other data associated with the word to indicate to the TTS module 314 to synthesize the speech for that word in a manner consistent with an interjection (for example by modulating the audio corresponding to that word to sound more excited than the audio for surrounding words). The speech quality module 220 may determine interjections based on a table indicating what words may be interjections for certain applications, users, etc. or using different techniques, such as those described herein.

The TTS module/processor 314 includes a TTS front end (TTSFE) 316, a speech synthesis engine 318, and TTS storage 320. The TTSFE 316 transforms input text data (for example from command processor 290) into a symbolic linguistic representation for processing by the speech synthesis engine 318. The TTSFE 316 may also process tags or other data input to the TTS module that indicate how specific words should be pronounced (e.g., an indication that a word is an interjection). The speech synthesis engine 318 compares the annotated phonetic units models and information stored in the TTS storage 320 for converting the input text into speech. The TTSFE 316 and speech synthesis engine 318 may include their own controller(s)/processor(s) and memory or they may use the controller/processor and memory 310 of the server 120, device 110, or other device, for example. Similarly, the instructions for operating the TTSFE 316 and speech synthesis engine 318 may be located within the TTS module 314, within the memory and/or storage of the server 120, device 110, or within an external device.

Text input into a TTS module 314 may be sent to the TTSFE 316 for processing. The front-end may include modules for performing text normalization, linguistic analysis, and linguistic prosody generation. During text normalization, the TTSFE processes the text input and generates standard text, converting such things as numbers, abbreviations (such as Apt., St., etc.), symbols ($, %, etc.) into the equivalent of written out words.

During linguistic analysis the TTSFE 316 analyzes the language in the normalized text to generate a sequence of phonetic units corresponding to the input text. This process may be referred to as phonetic transcription. Phonetic units include symbolic representations of sound units to be eventually combined and output by the system as speech. Various sound units may be used for dividing text for purposes of speech synthesis. A TTS module 314 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage module 320. The linguistic analysis performed by the TTSFE 316 may also identify different grammatical components such as prefixes, suffixes, phrases, punctuation, syntactic boundaries, or the like. Such grammatical components may be used by the TTS module 314 to craft a natural sounding audio waveform output. The language dictionary may also include letter-to-sound rules and other tools that may be used to pronounce previously unidentified words or letter combinations that may be encountered by the TTS module 314. Generally, the more information included in the language dictionary, the higher quality the speech output.

Based on the linguistic analysis the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text input to the TTS module 314. Such acoustic features may include pitch, energy, duration, and the like. Application of acoustic features may be based on prosodic models available to the TTS module 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTSFE 316, referred to as a symbolic linguistic representation, may include a sequence of phonetic units annotated with prosodic characteristics. This symbolic linguistic representation may be sent to a speech synthesis engine 318, also known as a synthesizer, for conversion into an audio waveform of speech for output to an audio output device 204 and eventually to a user. The speech synthesis engine 318 may be configured to convert the input text into high-quality natural-sounding speech in an efficient manner. Such high-quality speech may be configured to sound as much like a human speaker as possible, or may be configured to be understandable to a listener without attempts to mimic a precise human voice.

A speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, a unit selection engine 330 may match units to the input text to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS module 314 may include an acoustic model, or other models, which may convert a symbolic linguistic representation into a synthetic acoustic waveform of the text input based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 318, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Figure 4:
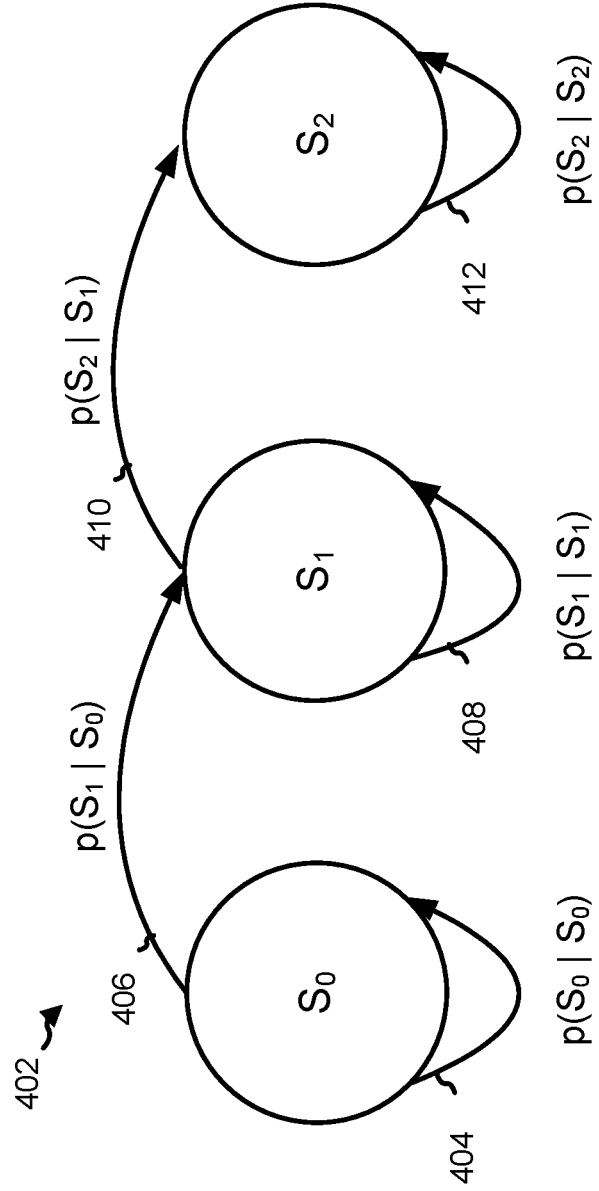
FIG. 4 illustrates speech synthesis using a Hidden Markov Model to perform text-to-speech (TTS) processing according to one aspect of the present disclosure.

An example of HMM processing for speech synthesis is shown in FIG. 4. A sample input phonetic unit, for example, phoneme/E/, may be processed by a parametric synthesis engine 332. The parametric synthesis engine 332 may initially assign a probability that the proper audio output associated with that phoneme is represented by state $S_0$ in the Hidden Markov Model illustrated in FIG. 4. After further processing, the speech synthesis engine 318 determines whether the state should either remain the same, or change to a new state. For example, whether the state should remain the same 404 may depend on the corresponding transition probability (written as $P(S_0|S_0)$, meaning the probability of going from state $S_0$ to $S_0$) and how well the subsequent frame matches states $S_0$ and $S_1$. If state $S_1$ is the most probable, the calculations move to state $S_1$ and continue from there. For subsequent phonetic units, the speech synthesis engine 318 similarly determines whether the state should remain at $S_1$, using the transition probability represented by $P(S_1|S_1)$ 408, or move to the next state, using the transition probability $P(S_2|S_1)$ 410. As the processing continues, the parametric synthesis engine 332 continues calculating such probabilities including the probability 412 of remaining in state $S_2$ or the probability of moving from a state of illustrated phoneme/E/ to a state of another phoneme. After processing the phonetic units and acoustic features for state $S_2$, the speech recognition may move to the next phonetic unit in the input text.

The probabilities and states may be calculated using a number of techniques. For example, probabilities for each state may be calculated using a Gaussian model, Gaussian mixture model, or other technique based on the feature vectors and the contents of the TTS storage 320. Techniques such as maximum likelihood estimation (MLE) may be used to estimate the probability of particular states.

In addition to calculating potential states for one audio waveform as a potential match to a phonetic unit, the parametric synthesis engine 332 may also calculate potential states for other potential audio outputs (such as various ways of pronouncing phoneme/E/) as potential acoustic matches for the phonetic unit. In this manner multiple states and state transition probabilities may be calculated.

The probable states and probable state transitions calculated by the parametric synthesis engine 332 may lead to a number of potential audio output sequences. Based on the acoustic model and other potential models, the potential audio output sequences may be scored according to a confidence level of the parametric synthesis engine 332. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text.

Unit selection speech synthesis may be performed as follows. Unit selection includes a two-step process. First a unit selection engine 330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 330. As part of unit selection, the unit selection engine 330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 320, in storage 312, or in another storage component. For example, different unit selection databases may be stored in TTS voice unit storage 372. Each speech unit database includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 318 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output. An example of how unit selection is performed is illustrated in FIGS. 5A and 5B.

For example, as shown in FIG. 5A, a target sequence of phonetic units 502 to synthesize the word "hello" is determined by a TTS device. As illustrated, the phonetic units 502 are individual phonemes, though other units, such as diphones, etc. may be used. A number of candidate units 504 may be stored in the voice corpus. Although phonemes are illustrated in FIG. 5A, other phonetic units, such as diphones, may be selected and used for unit selection speech synthesis. For each phonetic unit there are a number of potential candidate units (represented by columns 506, 508, 510, 512 and 514) available. Each candidate unit represents a particular recording of the phonetic unit with a particular associated set of acoustic and linguistic features. The TTS system then creates a graph of potential sequences of candidate units to synthesize the available speech. The size of this graph may be variable based on certain device settings. An example of this graph is shown in FIG. 5B. A number of potential paths through the graph are illustrated by the different dotted lines connecting the candidate units. A Viterbi algorithm may be used to determine potential paths through the graph. Each path may be given a score incorporating both how well the candidate units match the target units (with a high score representing a low target cost of the candidate units) and how well the candidate units concatenate together in an eventual synthesized sequence (with a high score representing a low join cost of those respective candidate units). The TTS system may select the sequence that has the lowest overall cost (represented by a combination of target costs and join costs) or may choose a sequence based on customized functions for target cost, join cost or other factors. The candidate units along the selected path through the graph may then be combined together to form an output audio waveform representing the speech of the input text. For example, in FIG. 5B the selected path is represented by the solid line. Thus units $\#_2$, $H_1$, $E_4$, $L_3$, $O_3$, and $\#_4$ may be selected, and their respective audio concatenated, to synthesize audio for the word "hello."

Audio waveforms including the speech output from the TTS module 314 may be sent to an audio output component, such as a speaker for playback to a user or may be sent for transmission to another device, such as another server 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS module 314 may be configured to perform TTS processing in multiple languages. For each language, the TTS module 314 may include specially configured data, instructions and/or components to synthesize speech in the desired language(s). To improve performance, the TTS module 314 may revise/update the contents of the TTS storage 320 based on feedback of the results of TTS processing, thus enabling the TTS module 314 to improve speech recognition.

Other information may also be stored in the TTS storage 320 for use in speech recognition. The contents of the TTS storage 320 may be prepared for general TTS use or may be customized to include sounds and words that are likely to be used in a particular application. For example, for TTS processing by a global positioning system (GPS) device, the TTS storage 320 may include customized speech specific to location and navigation. In certain instances the TTS storage 320 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 318 may include specialized databases or models to account for such user preferences.

For example, to create the customized speech output of the system, the system may be configured with multiple voice corpuses/unit databases 378a-378n, where each unit database is configured with a different "voice" to match desired speech qualities. The voice selected by the TTS module 314 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 378 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile and used for speech synthesis when the specific speech quality is desired. Customized voices may be created based on multiple desired speech qualities combined (for both unit selection or parametric synthesis). For example, one voice may be "shouted" while another voice may be "shouted and emphasized." Many such combinations are possible.

As an alternative to customized voice corpuses or customized parametric "voices," one or more filters may be used to alter traditional TTS output to match the desired one or more speech qualities. For example, a TTS module 314 may synthesize speech as normal, but the system (either as part of the TTS module 314 or otherwise) may apply a filter to make the synthesized speech sound take on the desired speech quality. In this manner a traditional TTS output may be altered to take on the desired speech quality.

During runtime a TTS module 314 may receive text for speech synthesis along with an indicator for a desired speech quality of the output speech, for example, an indicator created by speech quality module 220. The TTS module 314 may then select a voice matching the speech quality, either for unit selection or parametric synthesis, and synthesize speech using the received text and speech quality indicator.

Figure 6:
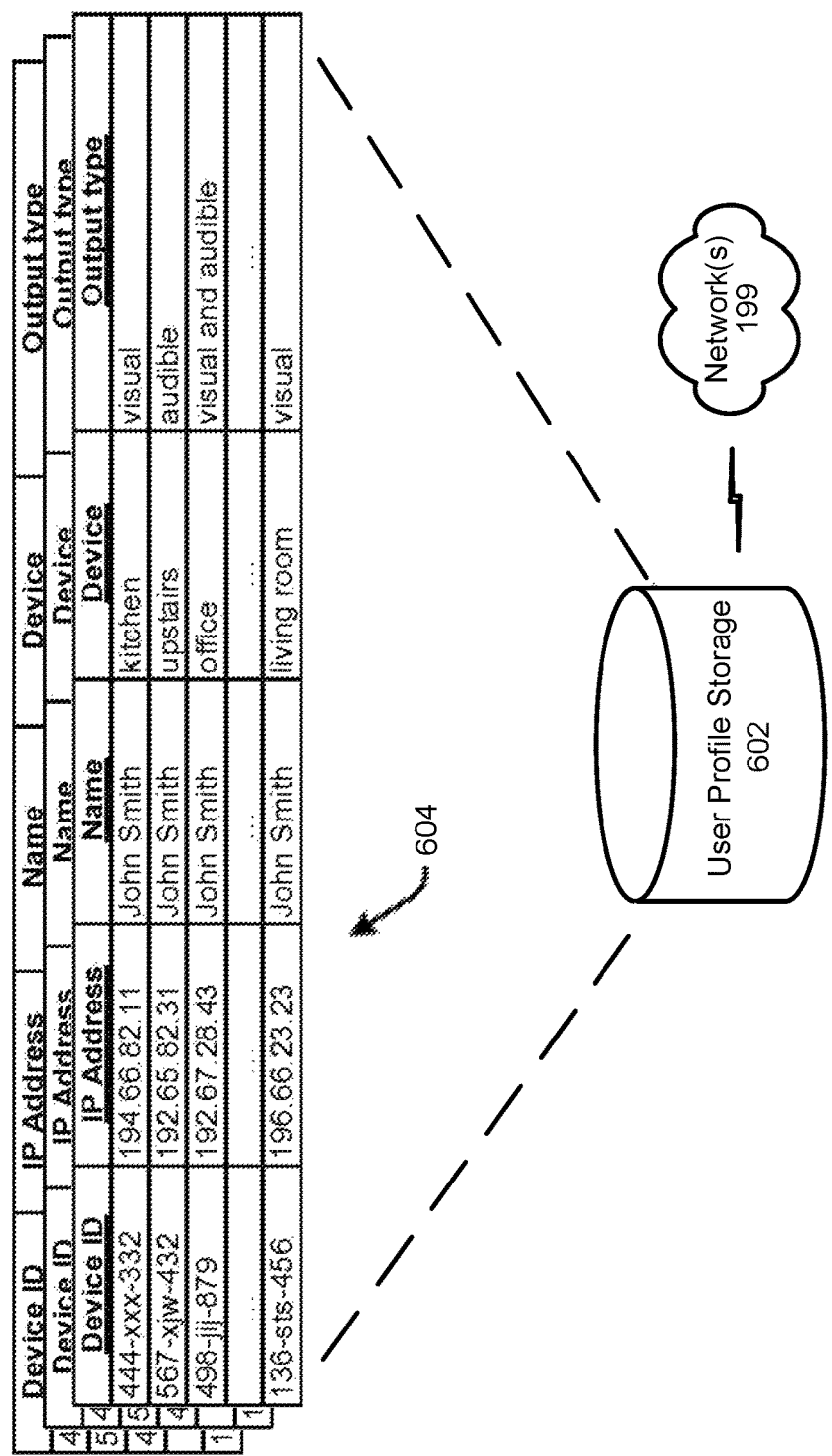
FIG. 6 illustrates data stored and associated with user profiles according to embodiments of the present disclosure.

FIG. 6 illustrates a user profile storage 602 that includes data regarding user accounts 604 as described herein. The user profile storage 602 may be located proximate to the server 120, or may otherwise be in communication with various components, for example over the network 199. The user profile storage 602 may communicate with the speech quality module 220 to determine words to be emphasized. For example, the user profile storage 602 may include non-audio data associated with user accounts. For example, user accounts may include emphasized words associated with particular times of day, emphasized words associated with particular applications of a device, emphasized words associated with particular devices (e.g., a tablet, a speech-controlled device, etc.), etc. The user profile storage 602 may include a variety of information related to individual users, accounts, etc. that interact with the system 100. For illustration, as shown in FIG. 6, the user profile storage 602 may include data regarding the devices associated with particular individual user accounts 604. For example, the user accounts 604 may include particular words that are pronounced a certain way by certain users. The TTS module/component described herein may access the user accounts 604 to determine how words within text are pronounced by certain user and may use that information when performing TTS processing related to the particular user/user account. In an example, the user profile storage 602 is a cloud-based storage. Such data may include device identifier (ID) and internet protocol (IP) address information for different devices as well as names by which the devices may be referred to by a user. Further qualifiers describing the devices may also be listed along with a description of the type of object of the device.

FIG. 7 illustrates the generation of output audio with emphasized portions according to embodiments of the present disclosure. A speech controlled device 110a receives spoken audio from a user (illustrated as 702), converts the audio into audio data, and sends the audio data to a server 120 (illustrated as 704). The server 120 performs ASR on the audio data to determine text (illustrated as 706). Using the text, the server 120 determines at least one portion of the text is to be emphasized based on an application being run by the system 100 (illustrated as 708). For example, the server 120 may store (in a user profile 604 associated with the device 110a) or have access to a table containing specific words to be emphasized associated with particular applications run on the device 110a. The speech quality module 220 may access the user profile or table to determine applicable non-audio data (i.e., emphasized words associated with applications run on the device 110a). The server 120 then tags the portion (e.g., word(s)) to be emphasized in the text (illustrated as 710). For example, the word(s) to be emphasized may be tagged using SSML. The text (including the tag(s)) is then sent to a TTS component (either part of the server 120 or in communication with the server 120) that performs TTS on the tagged text to create output speech audio data (illustrated as 712). By performing TTS processing on the text, the output speech audio data includes an emphasized portion for each tagged portion of the text. The server 120 then sends the output speech audio data to a second speech controlled device 110b (illustrated as 714), which outputs audio corresponding to the output speech audio data (illustrated as 716). It should thus be appreciated that the audio output by the second speech controlled device 110b includes similar or identical inflection/emphasis as that contained within the audio captured/received by the first speech controlled device 110a. This allows for a user of the second speech controlled device 110b to understand the mood of the user of the first speech controlled device 110.

FIG. 8 illustrates the generation of output audio with emphasized portions according to embodiments of the present disclosure. The speech controlled device 110a receives spoken audio from a user (illustrated as 702), converts the audio into audio data, and sends the audio data to a server 120 (illustrated as 704). The server 120 performs ASR on the audio data to determine text (illustrated as 706). Using the text, the server 120 determines at least one portion of the text is to be emphasized based on a prosodic analysis of the received audio data (illustrated as 802). For example, the server 120 may determine a portion of the post-ASR text corresponds to an inflection within the audio data. Prosodic analysis may involve determining audio characteristics within the audio data. To determine the word of the text to be emphasized (e.g., to determine the word that has an audio characteristic that indicates the word is emphasized), the system may identify a time of the inflected portion within the audio data. The system may then perform ASR on the audio data to determine text and locate the word within the text by determining the location of the word using the time of the inflected portion. That is, the system may determine how long the audio data is that matches the text, how long the text is, and match the relative position of the infected portion in the audio data to a relative position of a word in the text. That word may be determined to be the word to be emphasized in a downstream process (such as in TTS output of a messaging application or the like). The server 120 then tags the portion (e.g., word(s)) of the text corresponding to the inflected portion of the audio data (illustrated as 710) based on the prosodic analysis (i.e., based on audio characteristics such as volume, frequency, etc. within the audio data). For example, the word(s) to be emphasized may be tagged using SSML.

The text (including the tag(s)) may then be sent to a TTS component (either part of the server 120 or in communication with the server 120) that performs TTS on the tagged text to create output speech audio data (illustrated as 712). By performing TTS processing on the text, the output speech audio data includes an emphasized portion for each tagged portion of the text. The server 120 then sends the output speech audio data to a second speech controlled device 110b (illustrated as 714), which outputs audio corresponding to the output speech audio data (illustrated as 716). It should thus be appreciated that the audio output by the second speech controlled device 110b includes similar or identical inflection/emphasis to that contained within the audio captured/received by the first speech controlled device 110a. This allows for a user of the second speech controlled device 110b to understand the mood of the user of the first speech controlled device 110a.

FIG. 9 illustrates the generation of output audio with emphasized portions according to embodiments of the present disclosure. The speech controlled device 110a receives spoken audio from a user (illustrated as 702), converts the audio into audio data, and sends the audio data to a server 120 (illustrated as 704). The server 120 performs ASR on the audio data to determine text (illustrated as 706) and performs NLU on the text (illustrated as 902). The server 120 then determines at least one portion of the text is to be emphasized based on a linguistic analysis of the NLU resulting text (illustrated as 904). For example, the server 120 may determine a portion of the post-NLU text that corresponds to a word or phrase commonly emphasized in communications. Linguistic analysis may involve analyzing grammar characteristic of the post-NLU text. The server 120 then tags the portion (e.g., word(s)) of the text using, for example, SSML (illustrated as 710) based on the linguistic analysis (i.e., based on grammar characteristics of the post-NLU text). The text (including the tag(s)) is then sent to a TTS component (either part of the server 120 or in communication with the server 120) that performs TTS on the text to create output speech audio data (illustrated as 712). By performing TTS processing on the text, the output speech audio data includes an emphasized portion for each tagged portion of the text. The server 120 then sends the output speech audio data to a second speech controlled device 110b (illustrated as 714), which outputs audio corresponding to the output speech audio data (illustrated as 716). It should therefore be appreciated that the audio output by the second speech controlled device 110b includes similar or identical inflection/emphasis to that contained within the audio captured/received by the first speech controlled device 110a. This allows for a user of the second speech controlled device 110b to understand the mood of the user of the first speech controlled device 110a.

FIG. 10 illustrates the generation of output audio with emphasized portions according to embodiments of the present disclosure. The speech controlled device 110a receives spoken audio from a user (illustrated as 702), converts the audio into audio data, and sends the audio data to a server 120 (illustrated as 704). The server 120 performs ASR on the audio data to determine text (illustrated as 706). The server 120 also accesses a user profile associated with the speech controlled device 110a (i.e., a device from which the audio data was received) (illustrated as 1002). The user profile storage 602 includes user profile(s) (associated with the devices 110a and/or 110b) that include words to be emphasized when spoken to the device 110a/110b. Accordingly, the server 120 compares words within the text to emphasized words associated with the user profile of the speech controlled device 110a (illustrated as 1004). When a match exists between one or more words in the text and the emphasized words associated with the user profile of the device 110a, the server 120 (namely the speech quality module 220) determines the one or more words of the text are to be emphasized (illustrated as 1006). The server 120 then tags the one or more words to be emphasized using, for example, SSML (illustrated as 710). The text (including the tag(s)) is then sent to a TTS component (either part of the server 120 or in communication with the server 120) that performs TTS on the text to create output speech audio data (illustrated as 712). By performing TTS processing on the text, the output speech audio data includes an emphasized portion for each tagged portion of the text. The server 120 then sends the output speech audio data to a second speech controlled device 110b (illustrated as 714), which outputs audio corresponding to the output speech audio data (illustrated as 716). It should therefore be appreciated that the audio output by the second speech controlled device 110b includes words having inflection/emphasis similar or identical to how the user routinely says the word(s) to the device 110a. This allows for a user of the second speech controlled device 110b to feel as if they are directly interacting with the user of the first speech controlled device 110a.

FIGS. 11A and 11B illustrate the generation of output audio with emphasized portions according to embodiments of the present disclosure. The speech controlled device 110a receives spoken audio from a user (illustrated as 702), converts the audio into audio data, and sends the audio data to a server 120 (illustrated as 704). The server 120 performs ASR on the audio data to determine text (illustrated as 706), and sends the text to an application server 120b (i.e., a server associated with an application that communicates with the speech controlled device 110a) (illustrated as 1102). The application server 120b determines one or more words to be emphasized within the text (illustrated as 1104), tags the word(s) using, for example, SSML (illustrated as 710), and sends the text (including the tag(s)) to the server 120 (illustrated as 1106). The text (including the tag(s)) is then sent to a TTS component (either part of the server 120 or in communication with the server 120) that performs TTS on the text to create output speech audio data (illustrated as 712). For example, metadata may be associated with the tags in the text. The metadata may be analyzed by the TTS component to determine how the tagged text (e.g., interjection) should be emphasized. For further example, speech units for concatenating may be selected based on the tags and/or metadata. The server 120 may optionally send the output speech audio data to the application server 120b to ensure the tagged text was processed properly (illustrated as 1108). Either after performing TTS on the text or receiving an indication from the application server 120b that the output speech audio data is correct (i.e., the text contains the proper emphasis/inflection) (illustrated as 1110), the server 120 may send the output audio data to the first speech controlled device 110a and/or the second speech controlled device 110b either directly or via the application server 120b (illustrated as 714). Depending upon the situation, the first speech controlled device 110a and/or the second speech controlled device 110b outputs audio corresponding to the output speech audio data (illustrated as 716). It should thus be appreciated that the output audio includes words having inflection/emphasis as directed by the application server 120b. This is useful, for example, when a video game server desires to output audio with inflection to a user playing a video game.

While FIGS. 7-11 have been described in detail separately hereinabove, it should be appreciated that components of FIGS. 7-11 may be combined in various forms to create methods, systems, and devices according to the present disclosure.

Figure 12:
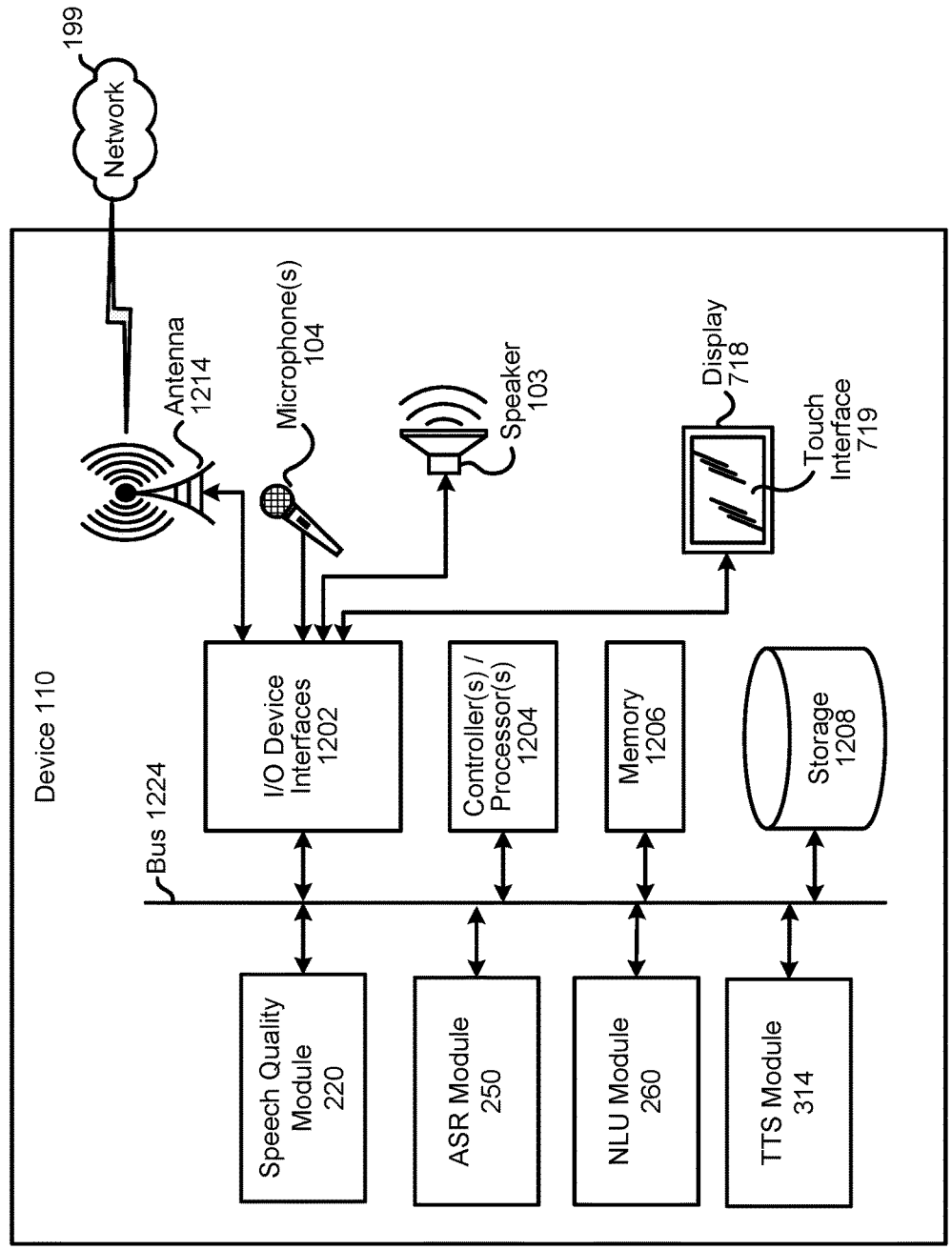
FIG. 12 is a block diagram conceptually illustrating example components of a device according to embodiments of the present disclosure.
Figure 13:
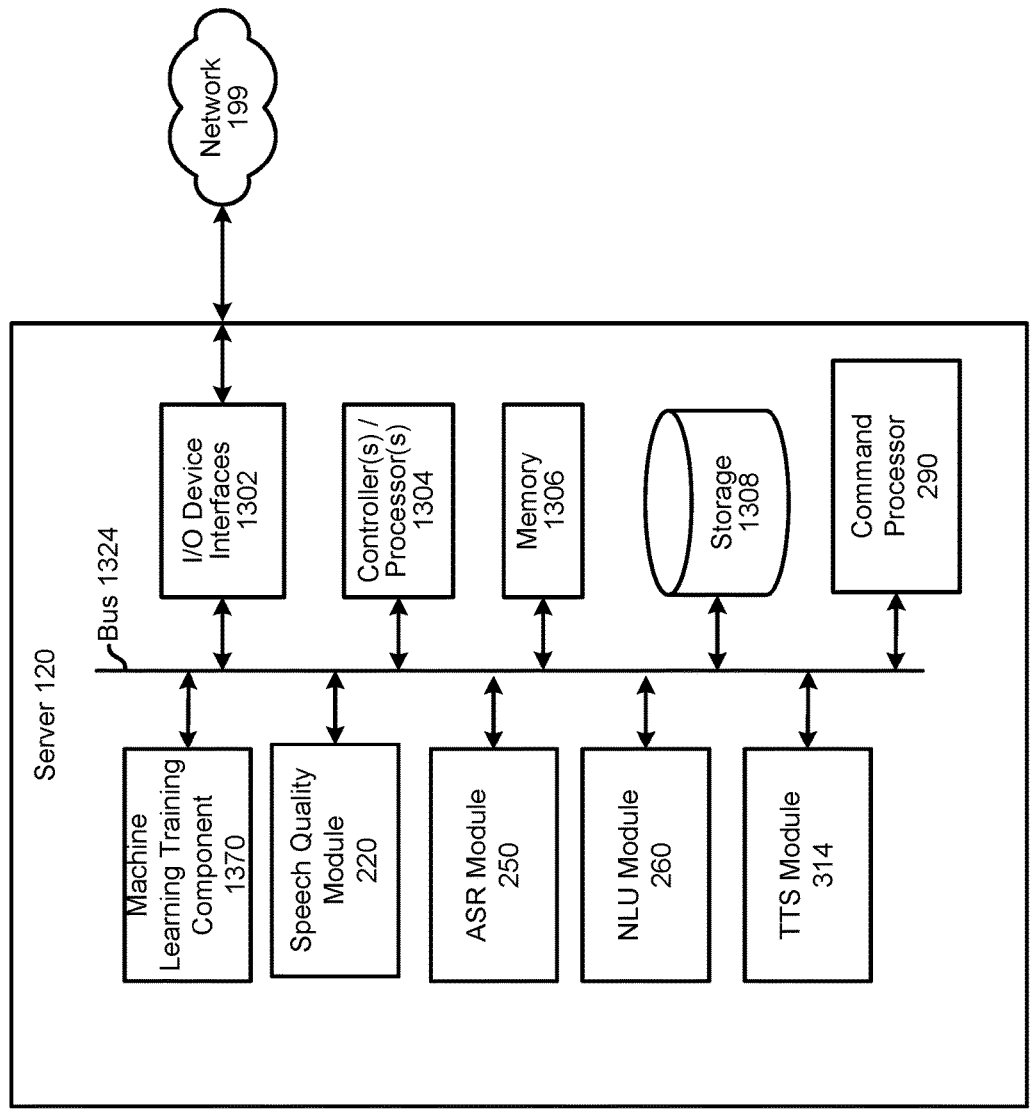
FIG. 13 is a block diagram conceptually illustrating example components of a server according to embodiments of the present disclosure.

FIG. 12 is a block diagram conceptually illustrating a local device 110 that may be used with the described system and may incorporate certain speech receiving/keyword spotting capabilities. FIG. 13 is a block diagram conceptually illustrating example components of a remote device, such as a remote server 120 that may assist with ASR, NLU processing, or command processing. Server 120 may also assist in determining similarity between ASR hypothesis results as described above. Multiple such servers 120 may be included in the system, such as one server 120 for ASR, one server 120 for NLU, etc. In operation, each of these devices may include computer-readable and computer-executable instructions that reside on the respective device (110/120), as will be discussed further below.

Each of these devices (110/120) may include one or more controllers/processors (1204/1304), that may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive (MRAM) and/or other types of memory. Each device may also include a data storage component (1208/1308), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1202/1302). The storage component (1208/1308) may include storage for various data including ASR models 252, NLU storage 273, the knowledge base, entity library 282, speech quality models 352, TTS voice unit storage 372, or other storage used to operate the system.

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces, as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to the device 110 of FIG. 12, the input/output device interfaces 1202 connect to a variety of components such as an audio output component such as a speaker 103, a wired headset or a wireless headset (not illustrated) or an audio capture component. The audio capture component may be, for example, a microphone 104 or array of microphones, a wired headset or a wireless headset (not illustrated), etc. If an array of microphones is included, approximate distance to a sound's point of origin may be performed acoustic localization based on time and amplitude differences between sounds captured by different microphones of the array. The microphone 104 may be configured to capture speech including an utterance. The device 110 (using microphone 104, ASR module 250, etc.) may be configured to determine audio data corresponding to the utterance. The device 110 (using input/output device interfaces 1202, antenna 1214, etc.) may also be configured to transmit the audio data to server 120 for further processing.

For example, via the antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as wakewords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include NLU storage 273, a knowledge base and/or entity library 282, or those storages may be separately located.

One or more servers 120 may also include a command processor 290 that is configured to execute commands associate with an ASR hypothesis as described above. One or more servers 120 may also include a machine learning training component 1370 that is configured to determine one or more models used by, for example, a speech quality module 220.

The device 110 and/or server 120 may include a speech quality module 220, which may be a separate component or may be included in an ASR module 250. The speech quality module 220 receives audio data and potentially non-audio data and classifies an utterance included in the audio according to detected qualities of the audio as described above. As described above, the speech quality module 220 may employ classifier(s) or other machine learning trained models to determine whether qualities associated with an utterance.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 12 and 13, are exemplary, and may be located a stand-alone device or may be included, in whole or in part, as a component of a larger device or system.

As illustrated in FIG. 14, multiple devices (110*a-f*, 120, 1402, 1404, and/or 1406) may contain components of the system 100 and the devices may be connected over a network 199.

The network 199 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, devices 110, networked camera(s) 1402 (which may also include one or more microphones), networked microphone(s) 1404 (or networked microphone array(s), not illustrated), networked speaker(s) 1406, etc. may be connected to the network 199 through a wireless service provider, over a WiFi or cellular network connection or the like. Other devices, such as server(s) 120, may connect to the network 199 through a wired connection or wireless connection. Networked devices 110 may capture audio using one-or-more built-in or connected microphones 104/1404 or audio capture devices, with processing performed by speech quality module 220, ASR, NLU, or other components of the same device or another device connected via network 199, such as speech quality module 220, ASR 250, NLU 260, etc. of one or more servers 120*c*. Further, inputs from camera(s) 1402, microphones 1404, speaker(s) 1406, or other components may be used by the system to provide paralinguistic metrics as described above.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method comprising:
   receiving, from a first speech-controlled device, first input audio data corresponding to a command to receive audio data;
   performing automatic speech recognition on the audio data to generate first text;
   determining a duration corresponding to how long at least one word is pronounced in the first input audio data;
   determining, based on the duration, a first portion of the audio data corresponding to a first word of the first text has a volume greater than a second portion of the audio data corresponding to other words in the first text;
   associating a first speech synthesis markup language (SSML) tag with the first word, the SSML tag indicating the first word is to be emphasized;
   performing text-to-speech (TTS) processing on the first text, using the first SSML tag, to create output audio data, the output audio data including emphasized speech corresponding to the first word; and
   sending, to a second speech-controlled device, the output speech audio data.

2. The computer-implemented method of claim 1, further comprising:
   determining the first text includes a second word;
   accessing a user profile associated with the first speech-controlled device, the user profile including a table of words to be emphasized;
   determining the second word is in the table;
   associating the second word with a second SSML tag, the second SSML tag indicating the second word is to be emphasized; and
   performing further TTS processing using the second SSML tag and the second word to create further output audio data, the further output audio data including emphasized speech corresponding to the second word.

3. The computer-implemented method of claim 1, wherein performing the text-to-speech processes comprises:
   selecting, from a first database of pre-stored emphasized speech units, a first pre-stored emphasized speech unit corresponding to the first word;
   selecting, from a second database of pre-stored non-emphasized speech units, a second pre-stored non-emphasized speech unit corresponding to a third word adjacent to the first word in the first text; and
   combining the first pre-stored emphasized speech unit and the second pre-stored non-emphasized speech unit to create a first portion of the output speech audio data, the first portion corresponding to the first and third words.

4. The computer-implemented method of claim 1, wherein the first word has a first non-emphasized portion, a middle emphasized portion, and a second non-emphasized portion, and wherein performing the text-to-speech processing comprises:
   selecting a first non-emphasized speech unit from a first database corresponding to the first portion;
   selecting a first emphasized speech unit from a second database corresponding to the middle portion;
   selecting a second non-emphasized speech unit from the first database corresponding to the second portion; and
   combining the first non-emphasized, middle emphasized, and second non-emphasized speech units to create a first portion of output speech audio data, the first portion corresponding to the first word.

5. A system comprising:
   at least one processor; and
   a memory including instructions operable to be executed by the at least one processor to perform a set of actions to configure the at least one processor to:
   receive, from a first device, input audio data;
   perform automatic speech recognition on the input audio data to create text including at least one word;
   determine a duration corresponding to how long the at least one word is pronounced in the input audio data;
   determine, based on the duration, that the at least one word is to be emphasized relative to other words in the text; and
   perform text-to-speech processing on the text to create output speech audio data, the output speech audio data including emphasized speech corresponding to the at least one word.

6. The system of claim 5, wherein the instructions further configure the at least one processor to:
   receive second text from an application running on the first device;
   access a table of words to be emphasized associated with the application; and
   identify the at least one word within the table.

7. The system of claim 5, further comprising: determining a volume associated with the at least one word.

8. The system of claim 5, wherein the instructions further configure the at least one processor to:
   perform natural language understanding (NLU) on the text to determine NLU results; and
   determine at least one word within the NLU results is typically emphasized in communications.

9. The system of claim 5, wherein the instructions further configure the at least one processor to:
   determine the at least one word in the input audio data is pronounced for a duration of time that exceeds a threshold duration of time; and
   determine the at least one word is to be emphasized further based on the duration of time that exceeds the threshold.

10. The system of claim 5, wherein the instructions further configure the at least one processor to:
    determine an operating application corresponding to the first device;
    send, to a server associated with the operating application, the text; and
    receive, from the server, a tag indicating a word to be emphasized in text-to-speech output.

11. The system of claim 5, wherein determining the at least one word comprises:
    determining a punctuation indicator proximate to the at least one word.

12. The system of claim 5, wherein the instructions further configure the at least one processor to:
    determine the at least one word is associated with emphasis alternatives;
    determine an example pronunciation of the at least one word; and
    determine an emphasis for the at least one word by comparing acoustic properties of the portion of the input audio data corresponding to the at least one word to the example pronunciation.

13. A computer-implemented method comprising:
receiving, from a first device, input audio data;
performing automatic speech recognition on the input audio data to create text including at least one word;
determining a duration corresponding to how long the at least one word is pronounced in the input audio data;
determining, based on the duration, that the at least one word that is to be emphasized relative to other words in the text; and
performing text-to-speech processing on the text to create output speech audio data, the output speech audio data including emphasized speech corresponding to the at least one word.

14. The computer-implemented method of claim 13, further comprising:
receiving second text from an application running on the first device;
accessing a table of words to be emphasized associated with the application; and
identifying the at least one word within the table.

15. The computer-implemented method of claim 13, further comprising: determining a volume associated with the at least one word.

16. The computer-implemented method of claim 13, further comprising:
performing natural language understanding (NLU) on the text to determine NLU results; and
determining at least one word within the NLU results is typically emphasized in communications.

17. The computer-implemented method of claim 13, wherein the method further comprises:
determining the at least one word in the input audio data is pronounced for a duration of time that exceeds a threshold duration of time; and
determining the at least one word is to be emphasized based on the duration of time that exceeds the threshold.

18. The computer-implemented method of claim 13, further comprising:
determining an operating application corresponding to the first device;
sending, to a server associated with the operating application, the text; and
receiving, from the server, a tag indicating a word to be emphasized in text-to-speech output.

19. The computer-implemented method of claim 13, wherein determining the at least one word comprises:
determining a punctuation indicator proximate to the at least one word.

20. The computer-implemented method of claim 13, further comprising:
determining the at least one word is associated with emphasis alternatives;
determining an example pronunciation of the at least one word; and
determining an emphasis for the at least one word by comparing acoustic properties of the a portion of the input audio data corresponding to the at least one word to the example pronunciation.

* * * * *